United States Patent
Eidelson

(10) Patent No.: US 10,179,617 B2
(45) Date of Patent: **\*Jan. 15, 2019**

(54) DRIVEN LOAD-BEARING SYSTEM

(71) Applicant: Arthur Eidelson, Highland Mills, NY (US)

(72) Inventor: Arthur Eidelson, Highland Mills, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/601,369

(22) Filed: May 22, 2017

(65) Prior Publication Data
US 2017/0253283 A1    Sep. 7, 2017

Related U.S. Application Data

(63) Continuation-in-part of application No. 14/614,285, filed on Feb. 4, 2015, now Pat. No. 9,656,700, which is a continuation of application No. 13/804,015, filed on Mar. 14, 2013, now Pat. No. 8,983,740.

(51) Int. Cl.
| | | |
|---|---|---|
| *B62D 51/00* | (2006.01) | |
| *G08C 17/02* | (2006.01) | |
| *B23P 6/00* | (2006.01) | |
| *B65D 19/42* | (2006.01) | |
| *G08C 23/00* | (2006.01) | |
| *B66F 9/06* | (2006.01) | |

(52) U.S. Cl.
CPC .............. *B62D 51/001* (2013.01); *B23P 6/00* (2013.01); *B65D 19/42* (2013.01); *B66F 9/063* (2013.01); *G08C 17/02* (2013.01); *G08C 23/00* (2013.01); *G08C 2201/71* (2013.01); *G08C 2201/93* (2013.01); *Y10T 29/49716* (2015.01)

(58) Field of Classification Search
USPC ......................................................... 701/50
See application file for complete search history.

(56) References Cited

U.S. PATENT DOCUMENTS

| | | |
|---|---|---|
| 4,415,049 A | 11/1983 | Wereb |
| 4,596,300 A | 6/1986 | Mankey |
| 5,180,023 A | 6/1993 | Reimers |
| 5,701,966 A | 12/1997 | Amico |
| 7,735,586 B2 | 6/2010 | Hämmerl |

(Continued)

OTHER PUBLICATIONS

Curtis Instruments, Inc., "enAble® 40 Powerchair Control System".

(Continued)

*Primary Examiner* — Tyler D Paige
(74) *Attorney, Agent, or Firm* — Logan R. Marc, Esq.

(57) ABSTRACT

A device for supporting and moving a load within an area may include a motive construct configured to support the load and move the load to a ground location within the area; a lift mechanism coupled to the motive construct, the lift mechanism being configured to effect movement of the motive construct to a height relative to the ground location; and a remote controller operatively coupled to the device via at least one of a cable connection and a wireless connection, the remote controller being configured to steer the motive construct and/or to control the lift mechanism. The device may further include at least one sensor to detect a characteristic of the load. The device may further include a braking system.

19 Claims, 17 Drawing Sheets

(56) References Cited

U.S. PATENT DOCUMENTS

| | | | |
|---|---|---|---|
| 8,072,309 B2 | 12/2011 | Kraimer et al. | |
| 8,708,349 B1 * | 4/2014 | Setzer, Sr. | B25J 9/041 |
| | | | 280/35 |
| 9,656,700 B2 * | 5/2017 | Eidelson | B62D 51/001 |
| 2005/0045409 A1 * | 3/2005 | Fenelli | B62D 51/001 |
| | | | 180/326 |
| 2005/0247508 A1 * | 11/2005 | Gilliland | B62B 5/06 |
| | | | 180/402 |
| 2008/0185222 A1 | 8/2008 | Herrmann et al. | |
| 2008/0196951 A1 | 8/2008 | Gal et al. | |
| 2008/0283661 A1 | 11/2008 | Henley | |
| 2009/0038864 A1 | 2/2009 | Yun | |
| 2015/0225082 A1 * | 8/2015 | Levron | B64D 9/00 |
| | | | 244/137.1 |
| 2017/0129522 A1 | 5/2017 | Lee et al. | |
| 2017/0253283 A1 * | 9/2017 | Eidelson | B23P 6/00 |

OTHER PUBLICATIONS

K&L Supply Co., "MC455 Fat Jack #37-8660".
Warner Electric, "Personal Mobility—Scooters & Wheelchairs".
Warner Electric, "Selecting the Correct Electrical Power-Off Brake".
Warner Electric, "Custom Designed Electrically Released Spring-Set Holding Brakes".
PG Drives Technology, "VR2 Series Wheelchair Control System" (Part 1 of 4).
PG Drives Technology, "VR2 Series Wheelchair Control System" (Part 2 of 4).
PG Drives Technology, "VR2 Series Wheelchair Control System" (Part 3 of 4).
PG Drives Technology, "VR2 Series Wheelchair Control System" (Part 4 of 4).
"Product Review: Drive Cart by Caster Concepts": https://www.youtube.com/watch?v=pEAOLbgOyVo, publication date Mar. 16, 2016.
"Drive Cart from Conceptual Innovations": https://www.youtube.com/watch?v=QxhVhKK2Nu4, publication date Oct. 15, 2015.
"Conversion Drive Caster for Heavy Duty Industrial Applications": https://www.youtube.com/watch?v=rdvEIOOPeok, publication date Aug. 19, 2016.
"Omnidirectional Drive Caster System": https://www.youtube.com/watch?v=qkcxk_AKVE, publication date Apr. 13, 2017.
"Tank Steering Drive Casters": https://www.youtube.com/watch?v=swljHNvAr2E, publication date Apr. 13, 2017.
Design drawing provided by Caster Concepts, Inc., which is allegedly related to a robot that was allegedly publicly exhibited in or around 1994 as part of a student-robotics program.

* cited by examiner

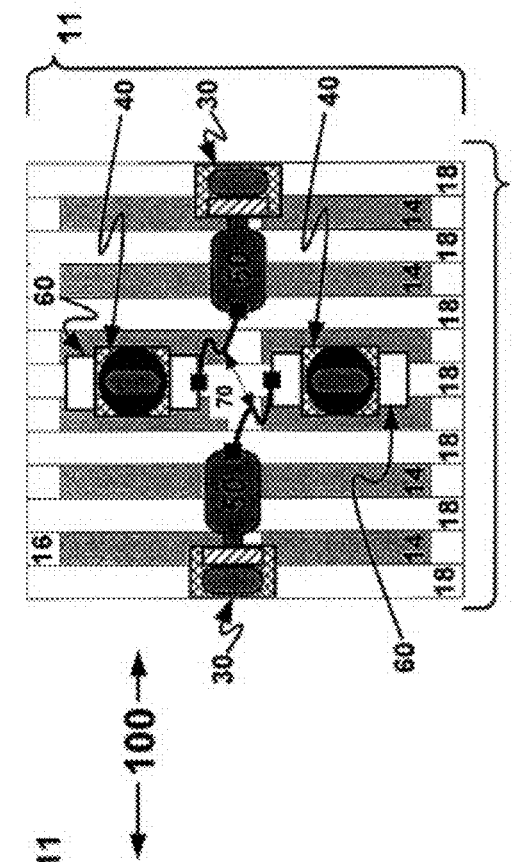
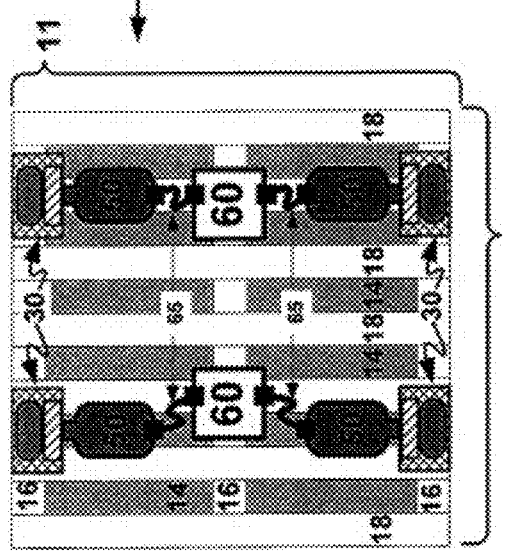
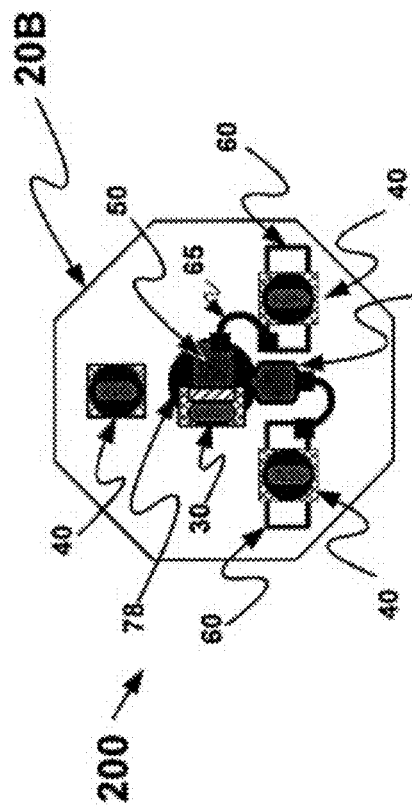
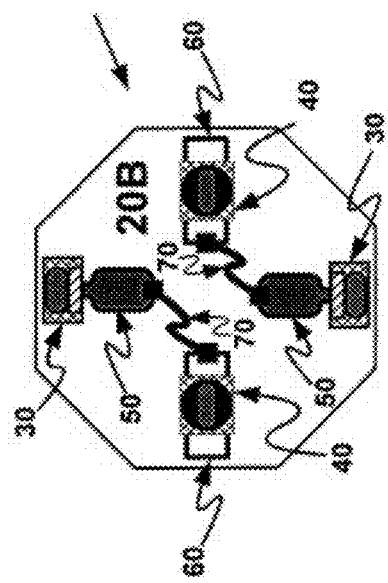
FIGURE 8A
FIGURE 8B
FIGURE 8C
FIGURE 8D

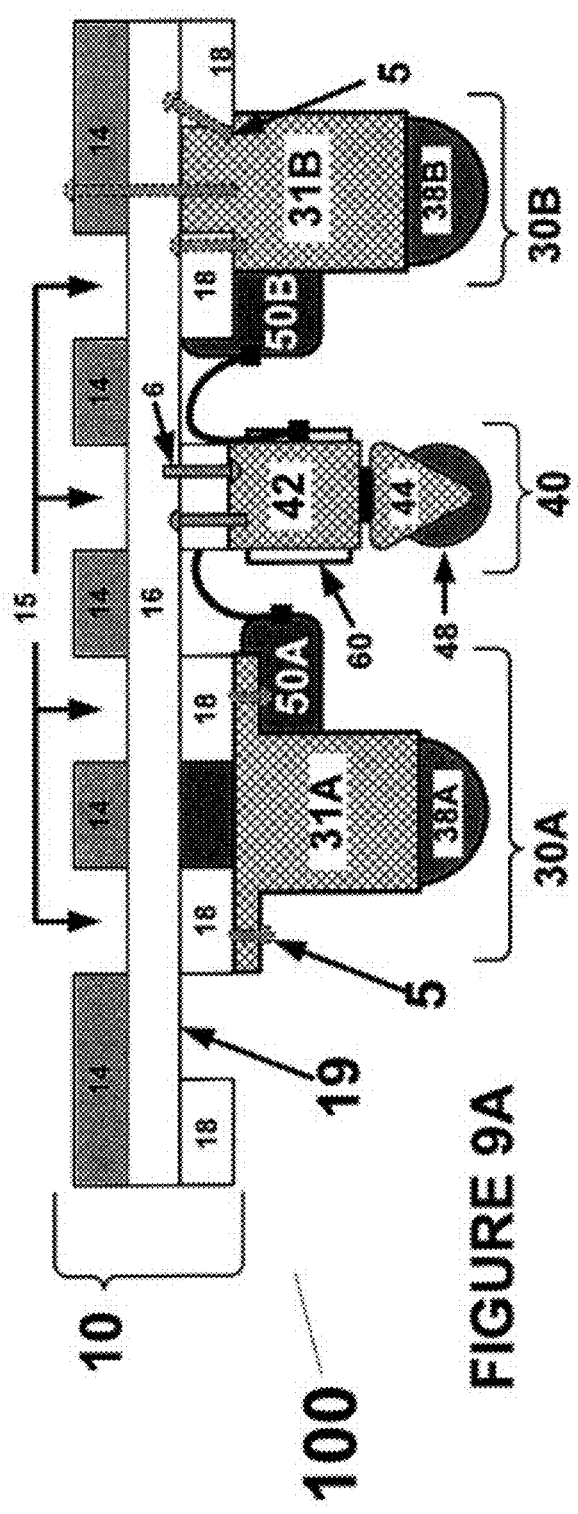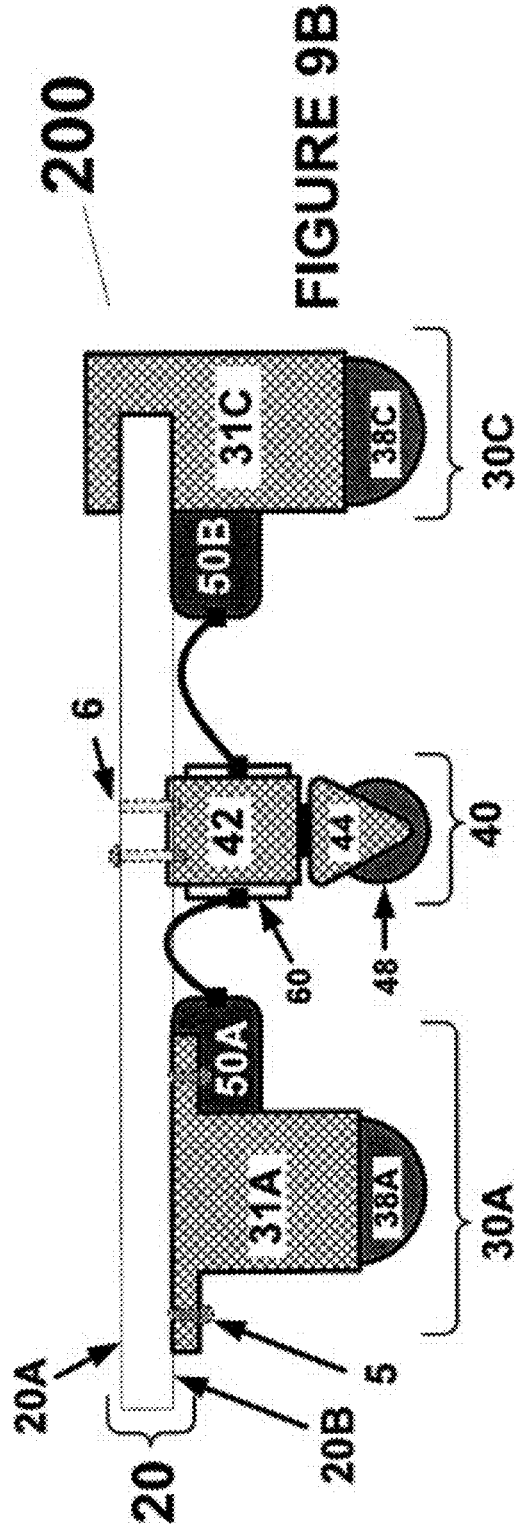

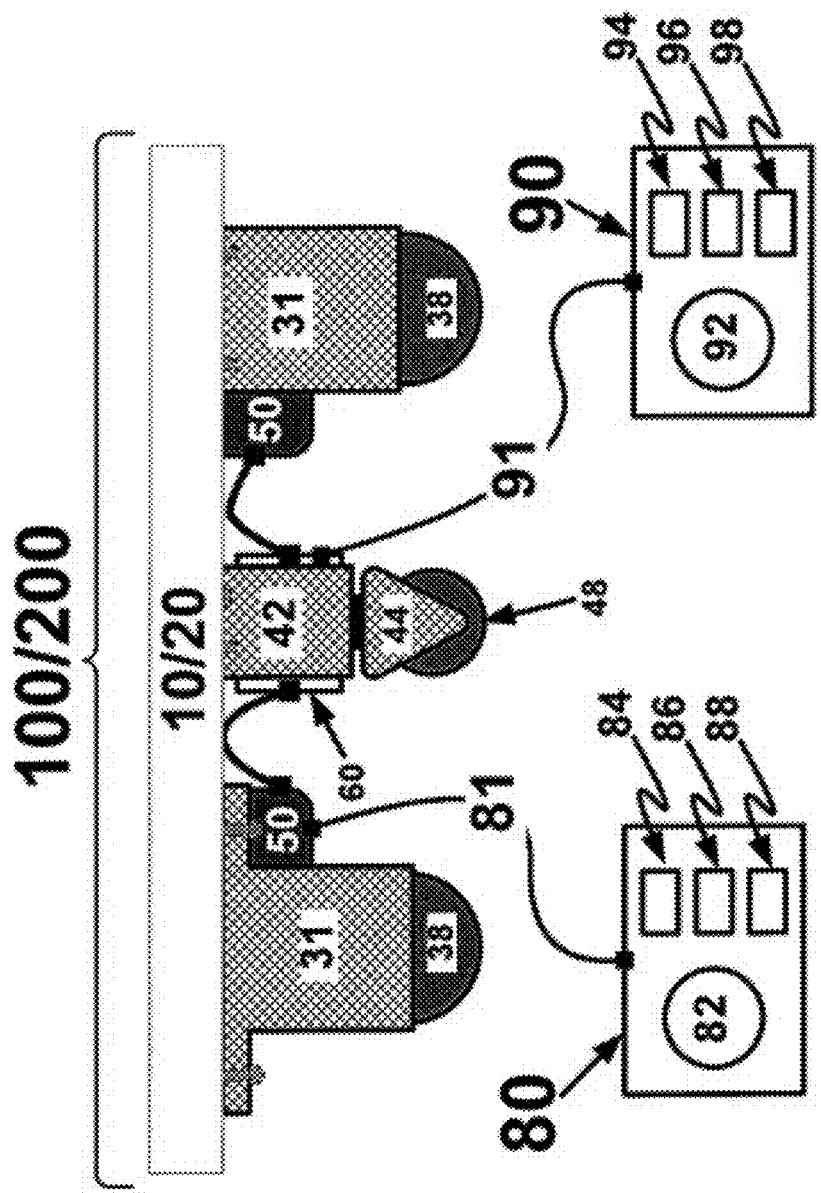

DRIVEN LOAD-BEARING SYSTEM

CROSS REFERENCE TO RELATED APPLICATIONS

The present application is a continuation-in-part of co-pending U.S. patent application Ser. No. 14/614,285 filed Feb. 4, 2015, which is a continuation of U.S. patent application Ser. No. 13/804,015, which was filed Mar. 14, 2103 and is now U.S. Pat. No. 8,983,740, the entire contents of each of which is hereby incorporated herein by reference.

FIGURE SELECTED FOR PUBLICATION

FIG. 12

BACKGROUND

Technical Field

The present disclosure relates to driven, load bearing systems and methods for constructing and using the same to move objects placed or stored thereon.

Description of the Related Art

Constructs, such as pallets and skids, which may be used for the support, storage, and transportation of materials, are in widespread usage. The most common types of pallets are constructed from wood, plastic, metal, or paper. Some pallets contain two decks made up from a plurality of longitudinally and laterally extending cross-board members and block members. One or more connecting members hold the upper and lower decks together while distributing the cargo loads placed on the upper deck. Alternatively, those skilled in the art may use skids in place of pallets.

In the art of material handling, transport devices such as pallet jacks, pallet trucks, end-rider trucks, and center trucks are wheeled devices that often incorporate a lifting mechanism intended for the manual lifting of a pallet, skid, dolly, or other loadable device. Where the loadable construct is a pallet, the load resting on top of the pallet, the pallet itself, and the transport device is moved from one work area to another. Once moved, the transport device disconnects from the recently transported pallet and is ready to grab or lift another pallet and its load resting on top of the pallet to another location. Timely and efficient transportation of cargo loads placed on the upper deck is very important in manufacturing operations.

Present attempts to provide material transport mechanisms have resulted in relatively expensive and bulky devices that either grab or lift a load resting on a pallet along with the pallet itself. For example, if the force is significant, the tines of a fork-lifting truck making contact with the lead boards of the pallet decks and/or connecting members of a pallet can cause damage during alignment.

Therefore, it is desirable to provide a device that can combine the support and material storage capabilities of a loadable construct, such as a pallet or skid with the transport capabilities of a pallet jack, pallet truck, end rider truck, or center truck.

SUMMARY

The present disclosure includes a device comprising a loadable construct having an upper surface and a lower surface, the upper surface being configured for carrying a load. The construct also has at least one drive wheel disposed on the construct, at least one motor operatively coupled to each of the at least one drive wheel, at least one power source electrically coupled to the at least one motor, and a controller operatively coupled to the at least one motor and/or or the at least one power source and configured to control movement of the at least one drive wheel.

The present disclosure also includes loadable constructs such as pallets or skids. Accordingly, it may be useful to combine the support and material storage capabilities of a loadable construct, such as a pallet, with the transport capabilities of a pallet jack, pallet truck, end rider truck, or center truck to accomplish other tasks, such as preventing pallet damage caused by lifting devices intended for the lifting of a pallet. It may be also useful to eliminate cross-contamination in critical manufacturing and warehouse operations introduced by way of the transport device having contact with materials transported to another manufacturing process, manufacturing operation, or storage location.

The present disclosure also includes power sources such as batteries. Accordingly, it is also useful to provide a driven pallet whose power source is rechargeable after hours of operation.

The present disclosure also includes a controller that may be electronically coupled to the driven, loadable construct by wired, wireless, or other means and be embedded in one or more compact digital mediums such as computers, laptops, handheld telecommunication or other such devices. Accordingly, it may be useful to provide a driven loadable construct whose movement forward, backward, left, or right at a desirable speed can be either wirelessly directed or commanded through a connection with a control unit containing a pointing device such as a joystick, switches, or application running on a computer, mobile device, or interactive display.

A device for supporting and moving a load within an area may include: a motive construct configured to support the load and move the load to a ground location within the area; a lift mechanism coupled to the motive construct, the lift mechanism being configured to effect movement of the motive construct to a height relative to the ground location; and a remote controller operatively coupled to the device via at least one of a cable connection and a wireless connection, the remote controller being configured to steer the motive construct and/or to control the lift mechanism. The remote controller may be handheld. The lift mechanism may be a scissor lift. The device may further include a motor; and a transmission, the transmission operatively coupling the motor to the lift mechanism. The motor may include any suitable motor, which may be, for example, at least one of an electric motor, a combustion motor, a pneumatic motor, a magnet motor, and a hydraulic motor. The device may further include at least one control circuit configured to control steering of the motive construct and to control operation of the lift mechanism, the remote controller being operatively connected to the at least one control circuit. The remote controller may include at least one designated button for sending a signal related to at least one lift mechanism operation. The remote controller may include a plurality of control circuit components each of which transmits a discrete signal as a result of physical interaction between a hand-operated directional control and the plurality of control circuit components. The directional control may include a joystick, a switch, a key pad, a touch screen, a scrolling device, or an application running on a machine from the group consisting of computers, mobile devices, interactive displays, and combinations thereof. The device may further include at least one sensor operatively coupled to the motive construct, the sensor being configured to determine at least one characteristic of the load supported by the motive construct; and at least one brake configured to selectively inhibit movement of the motive construct.

A device for supporting and moving a load may include: a motive construct configured to support and move the load; at least one sensor operatively coupled to the motive construct, the sensor being configured to determine at least one characteristic of the load supported by the motive construct; and a remote controller operatively coupled to the device via at least one of a cable connection and a wireless connection, the remote controller being configured to steer the motive construct. The at least one characteristic includes at least one of a gross weight, a net weight, and a tare weight. Such characteristics may be recorded along with a date of weighing, a time of weighing, and/or a location of weighing. The at least one characteristic may be recorded in at least one of a digital format, a printed format, a bar code format, and a human readable format.

A device for supporting and moving a load may include: a motive construct configured to support and move the load; at least one brake configured to selectively inhibit movement of the motive construct; and a remote controller operatively coupled to the device via at least one of a cable connection and a wireless connection, the remote controller being configured to steer the motive construct. The at least one brake may be an electromagnetic brake and/or a self-energizing brake.

The brake may be configured to automatically inhibit movement of the motive construct in response to a predetermined condition, e.g., when the motive construct is stopped or not in use. Advantageously, this provides an increased safety feature of the device such that, for example, when the motive construct is not in use and is on a sloped surface, the motive construct will be prevented from rolling or moving. For example, the predetermined condition may be when the device is in a powered off condition. The device may further include an override release mechanism configured to manually release the at least one brake to permit movement of the motive construct. The device may further include: a propulsion system configured to deliver a motive force to the device (e.g. power the drive wheels), and the predetermined condition may be when the propulsion system is not delivering the motive force to the device.

Various combinations of the above-described embodiments of the disclosure may also be provided.

The above and other aspects, features and advantages of the present disclosure will become apparent from the following description read in conjunction with the accompanying drawings, in which like reference numerals designate the same elements.

BRIEF DESCRIPTION OF THE DRAWINGS

A further understanding of the present disclosure can be obtained by reference to preferred embodiments set forth in the illustrations of the accompanying drawings. Although the illustrated preferred embodiment is merely exemplary of methods, structures and compositions for carrying out the present disclosure, both the organization and method of the disclosure, in general, together with further objectives and advantages thereof, may be more easily understood by reference to the drawings and the following description. The drawings are not intended to limit the scope of this disclosure, which is set forth with particularity in the claims as appended or as subsequently amended, but merely to clarify and exemplify the disclosure.

For a more complete understanding of the present disclosure, reference is now made to the following drawings in which:

FIG. 1A illustrates a cross-sectional view of line A-A drawn in FIG. 1.

FIG. 1B illustrates a cross-sectional view of line B-B drawn in FIG. 1.

FIGS. 2 and 2A illustrate an exemplary loadable construct.

FIG. 6A illustrates a cross-section view of line A-A drawn in FIG. 6.

FIGS. 8A and 8B illustrate bottom views of exemplary driven loadable constructs.

FIGS. 8C and 8D illustrate bottom views of other exemplary driven loadable constructs.

FIG. 9A illustrates another side view of an exemplary driven loadable construct.

FIG. 9B illustrates another side view of another exemplary driven loadable construct.

FIG. 10 illustrates exemplary controllers for an exemplary driven loadable construct.

Figure 1:
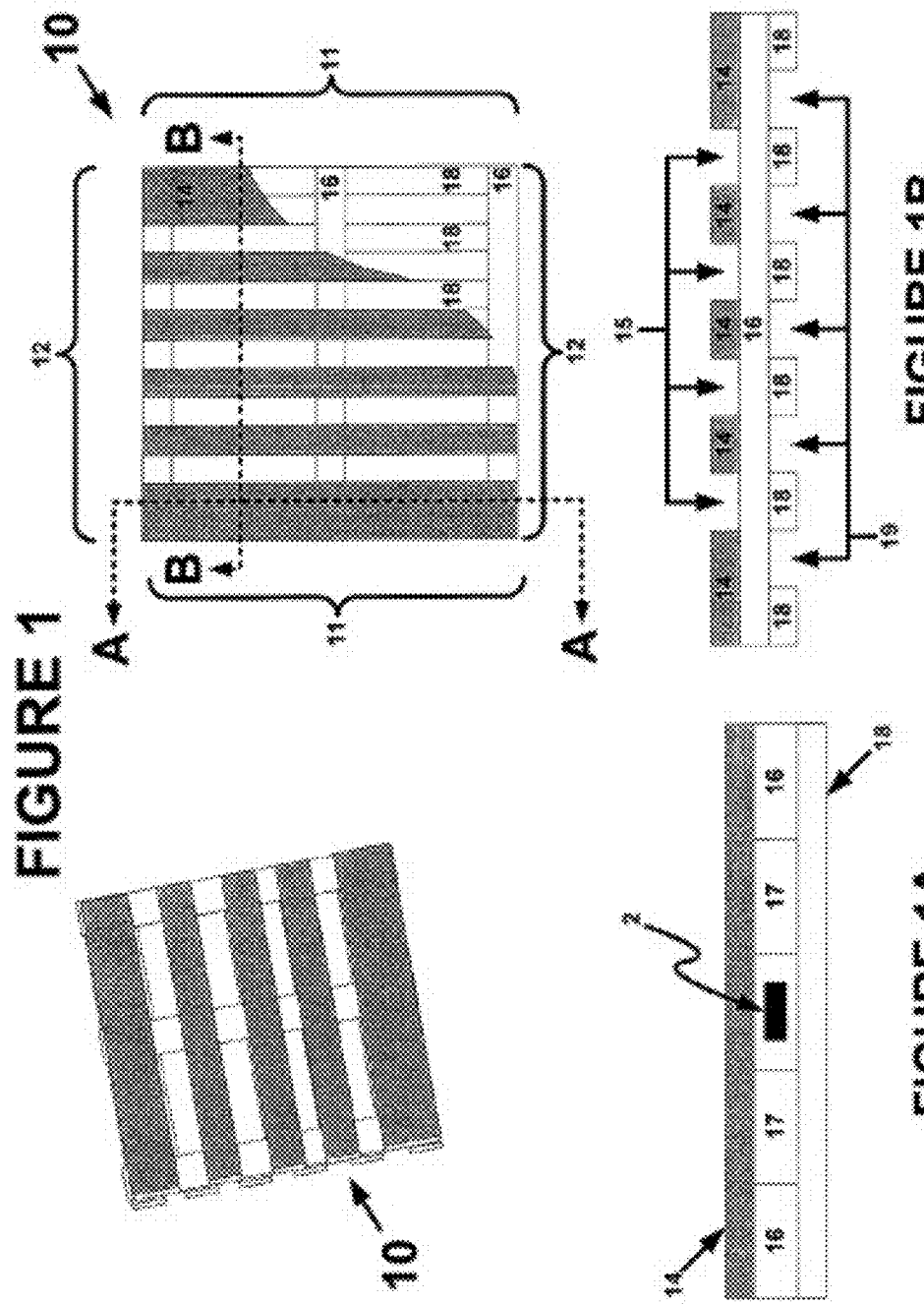
FIG. 1 illustrates an isometric and topographical view of an exemplary loadable construct.

In the drawings like characters of reference indicate corresponding parts in the different figures. The drawings are non-limiting examples of the disclosed embodiments of the present disclosure and corresponding parts in the different figures may be interchanged and interrelated to the extent such interrelationship is described or inherent from the disclosures contained herein.

DETAILED DESCRIPTION OF THE PREFERRED EMBODIMENTS

As required, a detailed illustrative embodiment of the present disclosure is disclosed herein. However, techniques, systems, compositions and operating structures in accordance with the present disclosure may be embodied in a wide variety of sizes, shapes, forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, below, etc., or motional terms, such as forward, back, sideways, transverse, etc. may be used with respect to the drawings. These and similar directional terms should not be construed to limit the scope of the invention in any manner.

The disclosures set forth herein relate to systems for providing movement to many forms of loadable constructs known to those skilled in the art which can carry or bear a load on one of its surfaces. An exemplary loadable construct may include but is not limited to pallets, skids, dollies, or bins.

FIG. 1 illustrates an exemplary loadable construct in the form of a pallet 10 containing one or more components making up an upper deck 14, one or more components making up a lower deck 18, and connecting members 16 coupling portions of upper deck 14 to portions of lower deck 18. While upper deck 14 and lower deck 18 may be shown as discrete portions separated by gaps, any suitable arrangement of components to make up an upper deck 14 or lower deck 18 of a pallet 10 may be utilized. Similarly, while connecting member 16 may be illustrated as being perpendicular to the components of upper deck 14 and/or lower deck 18, connecting member 16 may be arranged in any suitable fashion.

Pallet 10 has a face 11 and a side 12. An exemplary face 11 of a rectilinear pallet may be the boundary of the pallet 10 where the component of upper deck 14 most distal from the center of pallet 10 is arranged perpendicularly with the edge of connecting member 16 most distal from the center of pallet 10. An exemplary side 12 of a rectilinear pallet may be the boundary of the pallet 10 comprised of the most distal edge of the connecting member 16 that is most distal from the center of pallet 10 and is parallel to all other connecting members 16. Upper deck 14 may receive a load on its surface to be transported with the remainder of pallet 10. While the exemplary components and arrangement of components as illustrated in FIG. 1 may be referred to in other related figures and disclosures, an exemplary pallet 10 may be comprised of any number and arrangement of components known to those skilled in the art.

Referring to FIG. 1A, an exemplary profile view of face 11 may show upper deck 14 separate from lower deck 18 by one or more connecting members 16. The space separating upper deck 14 from lower deck 18 in which no portion of connecting member 16 occupies is pallet space 17. Where connecting member 16 is hollow or perforated, such a perforation or hollow opening may be illustrated as aperture 2. While FIG. 1A may show aperture 2 as rectilinear in cross section, aperture 2 may be any size or shape suitable for use in an exemplary connecting member 16.

Referring to FIG. 1B, an exemplary upper deck 14 may be comprised of a plurality of members separated by channels 15 to form a substantially corrugated pattern atop connecting members 16. Opposite upper deck 14, lower deck 18 may be comprised of a plurality of members separated by channels 19 to form a substantially corrugated pattern below connecting members 16. According to the exemplary embodiment of FIG. 1B, either upper deck 14 or lower deck 18 may be made of multiple components or a single component depending on the manufacture of the two parts of pallet 10. For instance, upper deck 14 and/or lower deck 18 may be formed of a solid material and cut to form various ribs that provide for a corrugated-like pattern above or below connecting members 16. Alternatively, upper deck 14 or lower deck 18 may be formed without channels 15 or 19.

Additionally, while shown in FIG. 1B as a contiguous piece of material, connecting member 16 may also be comprised of discrete portions with gaps interposed between the portions. In one exemplary embodiment, connecting member 16 may be divided into two or more blocks and placed at the edges and center portions of upper deck 14 and/or lower deck 18. In another exemplary embodiment, connecting member 16 may be divided into a multiple rows of blocks arranged in any fashion to maximize the carrying potential and load bearing capabilities of pallet 10. The size, shape, placement and arrangement of the various component parts and pieces of upper deck 14, lower deck 18, and connecting members 16 can be optimized for a particular application according to the knowledge of those skilled in the art.

An exemplary pallet 10 may be comprised of upper deck 14, lower deck 18, and connecting members 16 formed of any suitable material known to those skilled in the art, including plastic, wood, metal, paper, rubber, or any other materials capable of sustaining loads from subject matter placed thereon. An exemplary pallet 10 may be assembled by screws, nails, heat molding, adhesives, fasteners, welding, or any other mechanical, chemical, electrical, or other suitable fabrication methods known to those skilled in the art.

In a preferred embodiment, pallet 10 may be a conventional wooden pallet having the industry standard size and dimensions, which are currently 40 inches wide by 48 inches long (1.0 m by 1.2 m). According to the preferred embodiment, upper deck 14 may be secured to lower deck 18 by bolts, screws, nails, rivets, or other mechanical fasteners going through the surfaces of the decks 14/18 and into the surface of member 16. Other specifications for pallets may be readily determined by persons of skill in the art for use in a particular application. For example a wooden pallet may be 42 inches by 42 inches for communications equipment and paint, 40 inches by 48 inches for military and cement shipments, 36 inches by 36 inches for chemical drums, and 48 inches by 36 inches for shingles. These and other specifications are found and described in the Uniform Standard for Wood Pallets from the National Wooden Pallet and Container Association, Alexandria, Va., which is incorporated herein by reference in its entirety.

Figure 2:
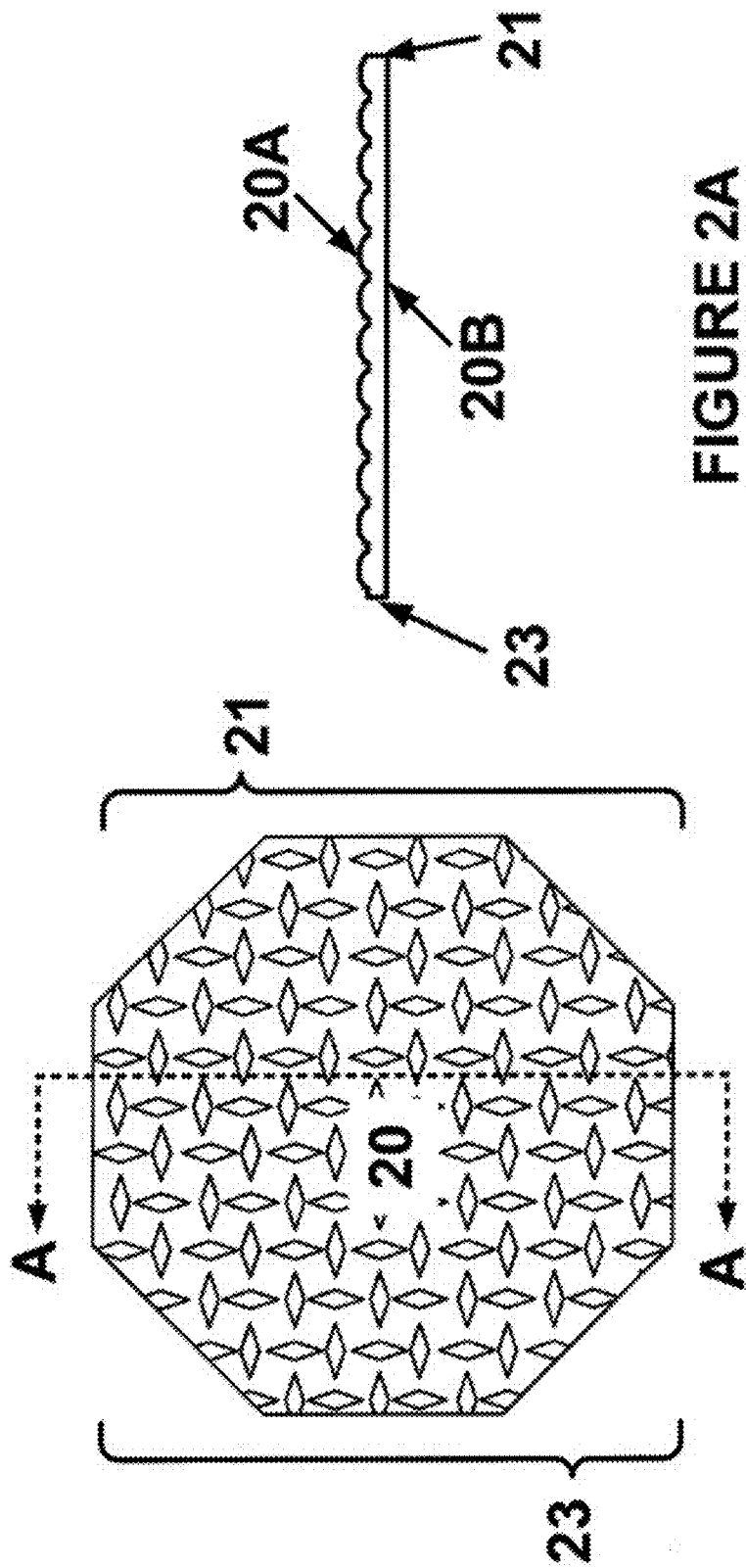

With reference to FIG. 2, another type of exemplary loadable construct may be a skid 20. Skid 20 may be cut, extruded, carved, or otherwise formed from a single piece of material, such as steel, aluminum, wood, plastic, paper, rubber, cast iron, brick, or titanium. Skid 20 may have a front 21 and a back 23. Skid 20 may be formed in any shape or configuration for given applications. In a preferred embodiment, skid 20 is an octagon-shaped portion of an aluminum alloy.

With reference to FIG. 2A, a top surface 20A of skid 20 may be comprised of surface abrasions, textures, or other contours for aid in holding a load. A bottom surface 20B may be similarly formed like top surface 20A, but may otherwise be smooth. In an exemplary embodiment according to FIGS. 2 and 2A, skid 20 may be bent or molded to retain certain sized loads or advantageously concentrate weight on certain parts of the skid 20.

Figure 3:
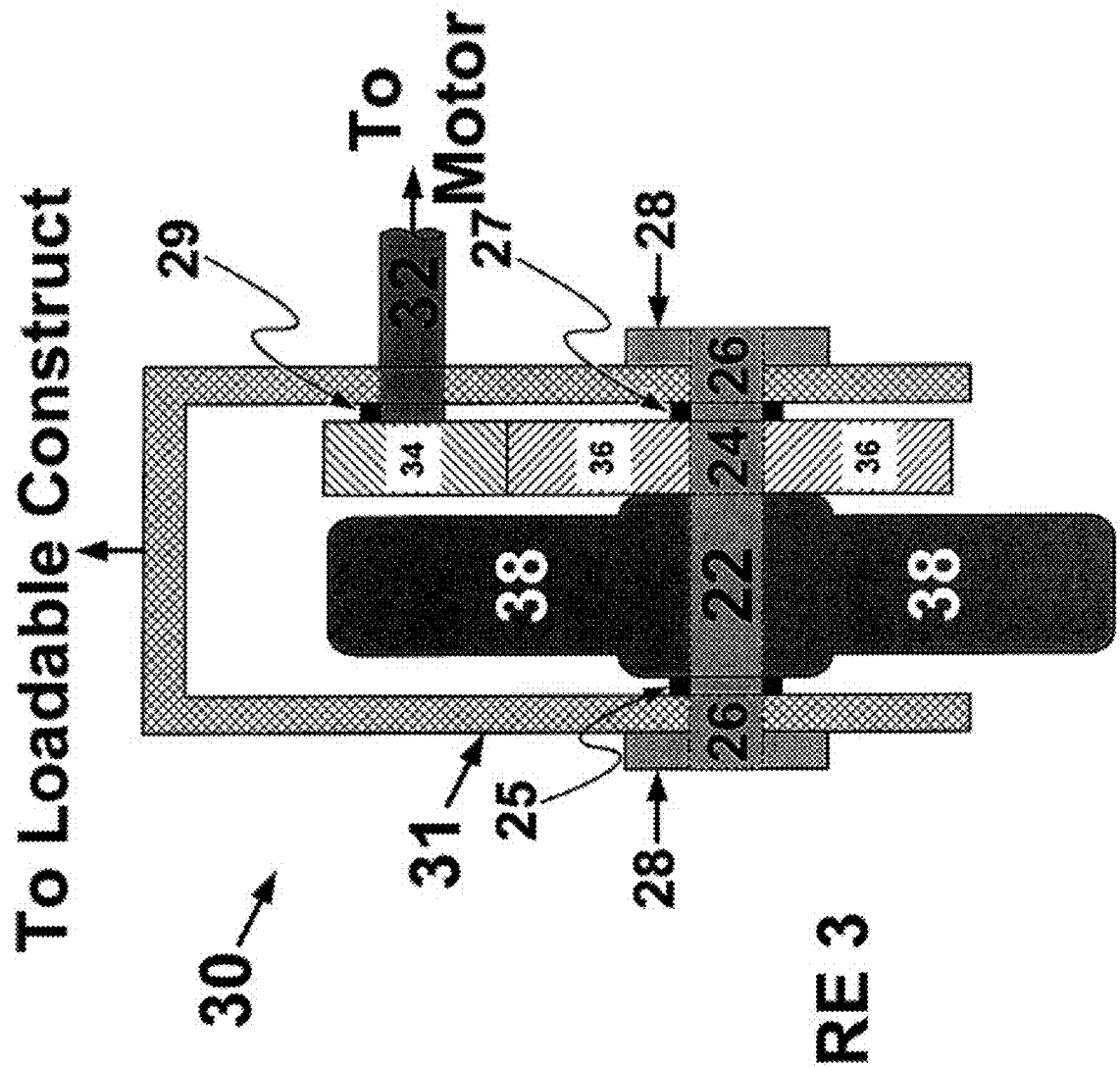
FIG. 3 illustrates an exemplary drive wheel assembly.

According to the illustrative embodiment of FIG. 3, a drive wheel assembly 30 may be comprised of a wheel frame 31 and a drive wheel 38 which may be driven by rotation of a drive shaft 32. A driven gear 34 mounted to drive shaft 32 via gear mount screw 29 may rotate drive gear 36 coupled to drive wheel 38. Drive wheel 38 and gear 36 rotate about axles 22 and 24, respectively, which are both coupled to axle end 26 and axle mount 28. Drive wheel 38 and gear 36 are disposed about axle 22 and 24 by virtue of an axle washer or spacer 25/27. While axle running through drive wheel 38 has been illustrated in sections, it may be understood that the several axle segments 22/24/26 may comprise a single axle.

An exemplary wheel frame 31 may be shaped or formed from any suitable material, such as a metal or plastic, to withstand the rotational forces resulting from drive shaft 32, gears 34 and 36, drive wheel 38, and axles 22, 24, and 26. An exemplary wheel frame 31 may also be shaped or formed from any suitable material to withstand the load forces and pressure of a loadable construct coupled to the wheel frame's exterior surface. A wheel frame 31 may be a solid metal bracket with openings for the various moving parts of the drive wheel assembly 30. While gears 34 and 36 are illustrated, any number of gears may be utilized to rotate drive wheel 38 in a given application. A person of ordinary skill in the art may vary the size, gear ratio, and material of a particular gear to provide optimized rotational capabilities to an exemplary drive wheel 38. According to another embodiment of an exemplary driven wheel assembly 30, gears 34/36 may be replaced with a chain drive and sprocket, or belt and pulley system. Further, a properly sized gear 34 may rotate drive wheel 38 directly without an intervening gear 36, for example, by the use of a properly sized drive gear 34.

In addition, any drive wheel assembly 30 or free wheel assembly 40 may be engineered to be either fixed or steerable dependent on the specific size, physical shape, material, loading characteristics, and design of the construct being either retrofitted or manufactured. Different diameter caster wheels 48 may be required. Additionally, various diameter drive wheels 38 may be used requiring a different gear reduction. Alternatively, a direct gear drive can be replaced by a belt or chain drive system.

An exemplary drive wheel 38 may be made out of rubber or metal (for reception on a rail or to hold a belt track). When coupled to a loadable construct, such as a pallet 10 or skid 20, an exemplary drive wheel 38 may be sized and shaped to accommodate the loads placed upon a loadable construct such as pallet 10 or skid 20 to move pallet 10 or skid 20 while holding such loads. In an exemplary embodiment illustrated by FIG. 3, a collar 28 may be affixed to each end of axle 22. Collar 28 may hold axle 22 fixed securely by way of collar screws through collar 28 and through wheel frame 31 (not shown). Additional screws may hold collar 28 fixed securely against wheel frame 31 facing a motor 50 (not shown). Spacers 25 and 27 may be placed between each end of drive wheel 38.

Figure 4B:
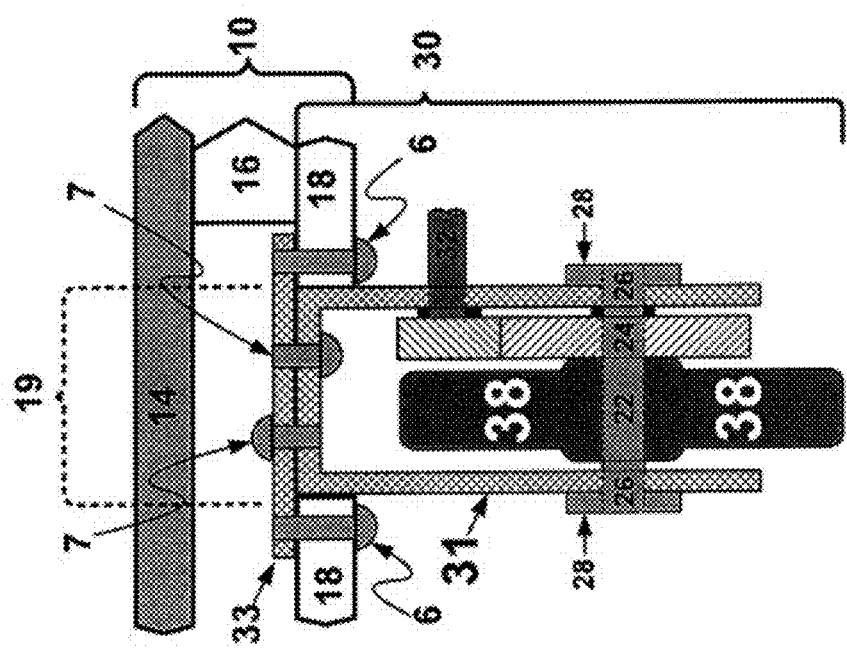
FIGS. 4A-B illustrate an exemplary drive wheel assembly in various coupled arrangements to exemplary loadable constructs.
Figure 4A:
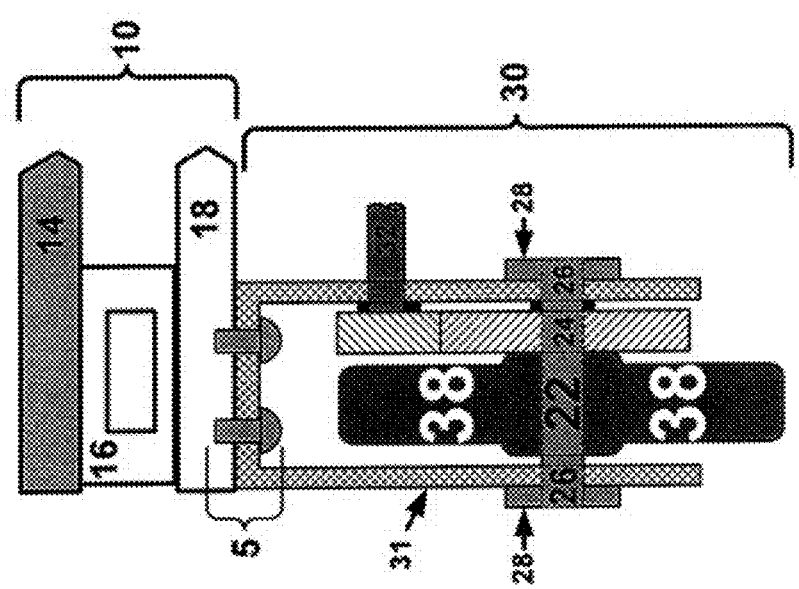

Referring to FIGS. 4A and 4B, an exemplary drive wheel assembly 30 may be coupled to a loadable construct, such as pallet 10, in a variety of ways. Drive wheel assembly 30 may be coupled to pallet 10 via its wheel frame 31. In FIG. 4A, wheel frame 31 may be bolted to lower deck 18 by use of mechanical coupling mechanism 5. An exemplary mechanical coupling mechanism 5 may include bolts, screws, clamps, and fasteners. Additionally, the same or similar mechanical, chemical, or alternative coupling mechanisms known to those skilled in the art usable to couple an exemplary upper deck 14, lower deck 18 and member 16 together as an exemplary pallet 10 may also be used for coupling an exemplary drive wheel assembly 30 to an exemplary pallet 10. For example, wheel frame 31 may be screwed into lower deck 18 or a combination of lower deck 18 and member 16. In an exemplary embodiment, a bolt or screw which attaches wheel frame 31 to pallet 10 may breach the inner surface of a hollow member 16 and be capped, bolted, or otherwise made to lock in the drive wheel assembly 30 to the lower deck 18 of pallet 10. In a further exemplary embodiment, drive wheel assembly 30 may be coupled to pallet 10 on its faces/sides 11/12 or a combination of pallet faces, sides, and decks.

With reference to FIG. 4B, wheel frame 31 may be further configured for attachment to other locations on a loadable construct by extension bracket 33. Extension bracket 33 may provide additional locations of coupling wheel frame 31 to pallet 10, for instance, within the channels 19 of lower deck 18 and/or within the pallet spaces 17 of pallet 10. An exemplary extension bracket 33 may be similarly coupled to wheel frame 31 through bracket couplers 7, which would be understood by persons of ordinary skill in the art to encompass all known mechanical and chemical couplings, such as, for example, bolts, screws, welds, rivets, and clamps. Bracket 33 may itself be coupled to pallet 10 by being situated and coupled across channels 19 in lower deck 18, being situated between lower deck 18 and upper deck 14 and coupled to one or the other, or being situated and coupled on or within connecting member 16. Coupling mechanisms 6 exclusively hold bracket 33 to pallet 10 and indirectly retain wheel frame 31 to pallet 10 by virtue of its coupling to bracket 33. An exemplary wheel frame 31 and/or bracket 33 may be coupled to pallet 10 directly and indirectly, simultaneously, using couplers 5, 6, and 7 for added strength or rigidity. Bracket 33 may be made out of the same or similar material as wheel frame 31 and can be configured to adapt drive wheel assembly 30 to any portion of pallet 10.

Figure 5:
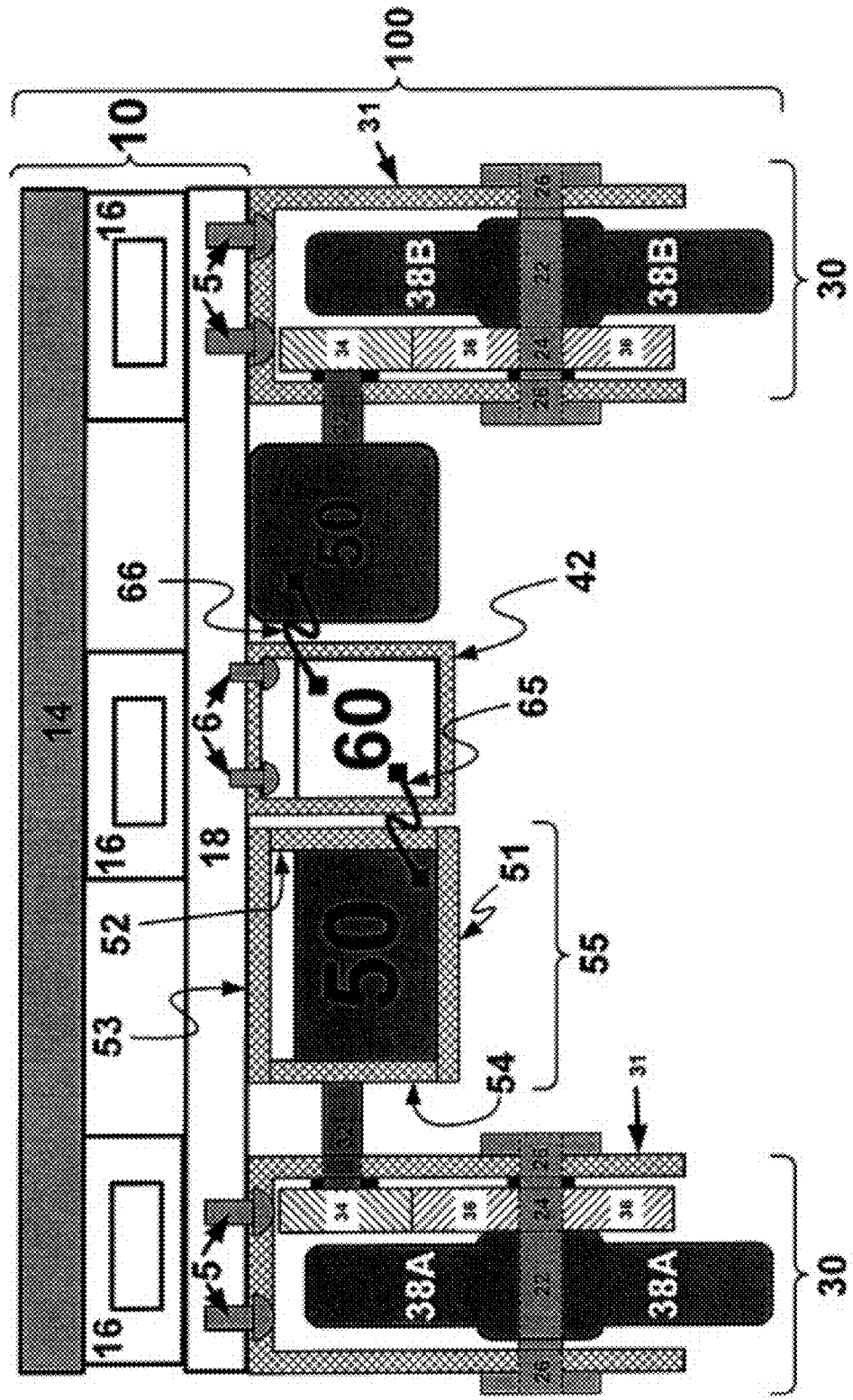
FIG. 5 illustrates a side view of an exemplary driven loadable construct.

Referring to the illustrative embodiment of FIG. 5, a plurality of drive wheel assemblies 30 may be coupled to a loadable construct, such as a pallet 10 or skid 20, to form a driven loadable construct ("DLC") 100. In an exemplary DLC system 100, the loadable construct used may be a pallet 10, the drive wheels 38A and 38B may be mounted to a wheel frame 31 by axles 22, 24, and 26, and they may be driven by the operative coupling of drive gears 36 and 34 and motor drive shaft 32. Again, while axles 22, 24, and 26 denote separate sections of a complete axle running through wheel frame 31, a unitary axle may be composed of each of the sections 22, 24, and 26 integrated together.

An exemplary drive shaft 32 may be driven by a motor 50 coupled to a loadable construct, such as a pallet 10 or skid 20, by a variety of coupling mechanisms known to those skilled in the art. An exemplary structure to couple motor 50 to pallet 10 may be a motor cradle 55. Alternatively, as shown in the exemplary embodiment illustrated in FIG. 5, drive wheel 38B may be driven by an operable arrangement of drive gears and shafts by a motor 50 mounted directly to the loadable construct, which may be a pallet 10. In another alternative exemplary embodiment, drive wheels 38A or 38B may be driven by a belt and pulley or chain and sprocket system connected to motor 50 in substitution for gears 36 and 34. An exemplary motor 50 may be any suitable motion delivery system suitable for the applications of carrying loads placed upon pallet 10 and to move the same.

In a preferred embodiment, motor 50 may be a permanent magnet motor of the type sold and manufactured by Leeson Electric Corporation of Grafton, Wis. In yet another preferred embodiment, motor 50 may run on 24 Volts, provide 1/10 Horsepower, and provide 15 lb-in of torque at 300 RPM. Additionally, 12 volt pancake motors from PMI Motion Technologies of Commack, N.Y. may be utilized to reduce the space occupied by otherwise longer and cylindrical motors. Other potential motor candidates also include DC motors and parallel shaft gearmotors from RAE Corporation of McHenry, Ill.

Where the loadable construct is a pallet 10, an exemplary motor cradle 55 may be coupled to the lower deck 18 of pallet 10 by one or more of the following: cradle floor 51, drive shaft panel 54, cradle wall 52, and/or cradle top 53. While motor cradle 55 may be illustrated as a rectilinear construct in FIG. 5, motor cradle 55 and any of cradle floor 51, drive shaft panel 54, cradle wall 52, and/or cradle top 53 may be shaped or configured in any way known to those skilled in the art to support an exemplary motor 50.

Motor cradle 55 and any of cradle floor 51, drive shaft panel 54, cradle wall 52, and/or cradle top 53 may be made of the same material as wheel frame 31, wheel section 44 (as shown and described with reference to FIGS. 6 and 6A), body section 42 (as shown and described with reference to FIGS. 6 and 6A), or bracket 33. Similarly, motor cradle 55 may be coupled to pallet 10 in the same or similar manner as wheel frame 31, body section 42 (as shown and described with reference to FIGS. 6 and 6A), wheel section 44 (as shown and described with reference to FIGS. 6 and 6A), or bracket 33.

In an exemplary embodiment, motor 50 may be supported by a combination of drive shaft panel 54, wheel frame 31 and lower deck 18. In this way, motor 50 may be suitably supported with a reduction in parts to reduce the weight of an exemplary DLC 100. Alternatively, drive shaft panel 54 may be integrated or one in the same with wheel frame 31. According to such an alternative embodiment, motor 50 may be suitably supported with a reduction in parts to reduce the weight of a DLC, such as a driven pallet 100. An exemplary cradle wall 52 may be perforated or contain gaps to allow passage of control circuitry 65 between motor 50 and a power source 60.

Power source 60 may be a battery, power cell, or group of power cells or batteries capable of powering an exemplary motor 50. In a preferred embodiment, power source 60 may be a rechargeable battery from Power-Sonic Corp. of San Diego, Calif. For example, power sources 60 may also be rechargeable, and a suitable recharger cable or cord (not shown) may be utilized to recharge such a power source 60 as is known to those skilled in the art. Accordingly, a recharge cord for an exemplary rechargeable power source 60 may be stored on DLC 100 by means of hooks, grips, Velcro, recoiling mechanisms, or other holding devices for cords known to those skilled in the art.

An exemplary power source 60 may be supported by a power source cradle 42, which may be similar in form and construction to motor cradle 55. Power source cradle 42 may be coupled to pallet 10 in the same or similar manner as wheel frame 31, body section 42, wheel section 41, bracket 33, or motor cradle 55. In an exemplary driven pallet system 100, power source 60 and power source cradle 42 may be mechanically connected to lower deck 18 via couplings 6. Exemplary couplings 6 for coupling power source 60 or power source cradle 42 may comprise the same or similar coupling mechanisms known to those skilled in the art, including bolts, screws, rivets, welds, and clamps, which may also be used for coupling wheel frame 31 to pallet 10 or upper deck 14, lower deck 18 or connecting member 16 to one another to make up pallet 10.

Power source cradle 42 may substantially cover all of power source 60 or may alternatively provide exposure of power source 60 to the ambient. In the alternative embodiment, an exposed power source 60 may benefit from ambient cooling when in operation. However, those skilled in the art may select power sources 60 which are suitable under the circumstances but would operate sufficiently regardless of ambient exposure.

In an alternative embodiment illustrated in FIG. 5, drive wheel assembly 30 may be comprised of a drive wheel 38B operably coupled for being driven by axles 22, 24, and 26 to drive gears 34 and 36, and drive shaft 32 to a mountable motor 50. An exemplary mountable motor 50 may be mountable to pallet 10 in the same or similar way as wheel frame 31 or wheel frame 31 in combination with bracket 33. For example, an exemplary mountable motor 50 may have openings for insertion of screws, bolts, or the like to secure motor 50 to pallet 10. Alternatively, mountable motor 50 may be shaped and sized to be received in one or more channels 19 in lower deck 18, or pallet spaces 17 of pallet 10. Like motor 50, mountable motor 50 may be electrically coupled to power source 60 via control circuitry 66.

Exemplary control circuitry 65 and 66 may be wire leads, cables, plugs, or any form of electrical leads known to those skilled in the art that provide for power from power source 60 to reach an exemplary motor 50. In one embodiment, control circuitry 65/66 may be free and unrestrained under pallet 10. In an alternative embodiment, control circuitry 65/66 may be restrained to the bottom of pallet 10 by use of adhesives, tapes, staples, screws, fasteners, or other mechanisms known to those skilled in the art to prevent substantially free movement of control circuitry during operation of driven pallet 100.

In a preferred embodiment, mounted on the hub of drive wheel 38 is ninety-six tooth driven gear 36 being fixedly secured by several mounting screws (not shown) to drive wheel 38. Mounted to the shaft 32 of a direct current motor 50 is forty-two tooth driven gear 34. Forty-two tooth driven gear 34 is held in place on the shaft 32 of motor 50 by way of setscrew 29. Driven gear 34 and drive gear 36 work in combination to provide a reduction ratio of 2.2857. The particular type of gear structure selected permits direct rotation of drive wheel 38 at a speed, which is appropriate for an operator walking besides an exemplary driven, loadable construct such as a pallet 10. Furthermore, the gear structure is selected to operate with direct current motor 50 in such a manner that sufficient power is delivered to rotate drive wheel 38 to transport fully loaded pallet 10 up a relatively steep incline. Two pairs of fixed drive wheel assemblies 30 are designed to move an 800 pound pallet load at three miles per hour on a flat surface for 3 hours before battery recharging is required. According to the aforementioned preferred embodiment, the power source consists of two pairs of 12-volt 26 ampere-hour batteries from Power-Sonic Corporation of San Diego, Calif. According to the preferred embodiment, a first pair of batteries are connected in series to yield 24-volts to power one set of drive wheels while another pair of batteries are connected in series to yield 24-volts to power an additional set of drive wheels. Alternatively, other arrangements of batteries may be utilized to power a drive wheel assembly 30 in accordance with the other teachings of the related embodiments disclosed herein.

Figure 6:
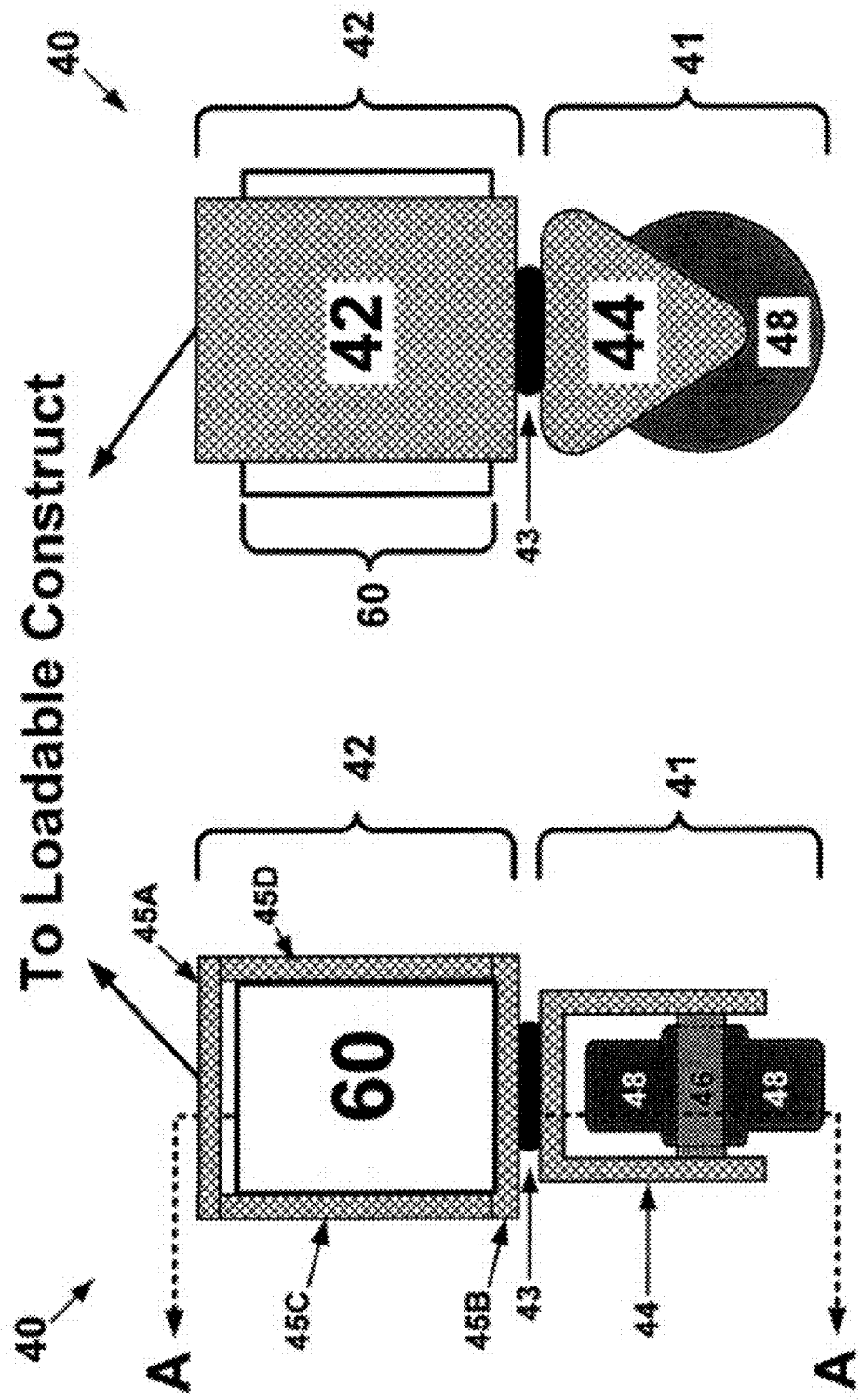
FIG. 6 illustrates an exemplary free wheel assembly.

According to the illustrative embodiments of FIGS. 6 and 6A, an exemplary free wheel assembly 40 may comprise a wheel section 41 and a body section 42. An exemplary wheel section 41 may comprise a wheel 48 within a socket or wheel brace 44 and rotating therein about axle 46. Wheel section 41 may be rotatably coupled to body section 42 by a revolute joint 43, which may comprise a swivel, a ball bearing, or a rotatable shaft. Alternatively, wheel section 41 may be directly coupled to body section 42 while a ball wheel 48 may be used. According to this alternative embodiment, ball wheel 48 would sit within the socket 44. Other wheel types and free wheel couplings known to those skilled in the art may be placed between wheel section 41 and body section 42 that permit substantially free range of motion of wheel section 41.

Free wheel assembly 40 contains a body section 42 which may be composed of several parts, 45A, 45B, 45C, and 45D. An exemplary body section 42 may be made of any suitable material for a particular loading application, such as, for example, metals. In an exemplary embodiment, body section 42 may be an open rectangular box-like structure made of top 45A and bottom 45B and side-walls 45C and 45D. In another exemplary embodiment, the parts of body section 42 may be sized and spaced accordingly to accommodate a power source 60 disposed therein. An exemplary free wheel assembly 40 may have a top 45A and a bottom 45B which are single pieces of material and side-walls 45B and 45C which contain openings or spaces to reduce the amount of material used in the side-walls or to provide adaptability for power source 60. Further, each of the parts 45A, 45B, 45C, and 45D may be interchangeable or replaced with other such parts to accommodate different power sources 60, different free wheels 48, different wheel sections 41, different drive wheel assemblies 30, and/or different loadable constructs, such as pallets 10 or skids 20.

Top 45A of free wheel 40 may be coupled to a loadable construct, such as pallet 10 or skid 20, by any of the same coupling mechanisms described above with respect to drive wheel assembly 30 or upper deck 14, lower deck 18, and connecting member 16. Similarly, each of top 45A, side-walls 45C and 45D, and bottom 45B may be coupled in similar fashion to each other as may be other components making up pallet 10, drive wheel assembly 30, or pallet 10 incorporating drive wheel assembly 30.

According to the illustrative embodiment of FIG. 6A, free wheel 40 may be held by a triangulated wheel brace 44 that may rotate freely via revolute joint 43. While wheel brace 44 may be triangulated, it may be any shape or size which permits clearance of rotation of wheel 48 when a load is applied and can sustain such load forces without disrupting the axle about which wheel 48 rotates. Body section 42 may be shown holding a power source 60 within its walls 45C/D.

Figure 7:
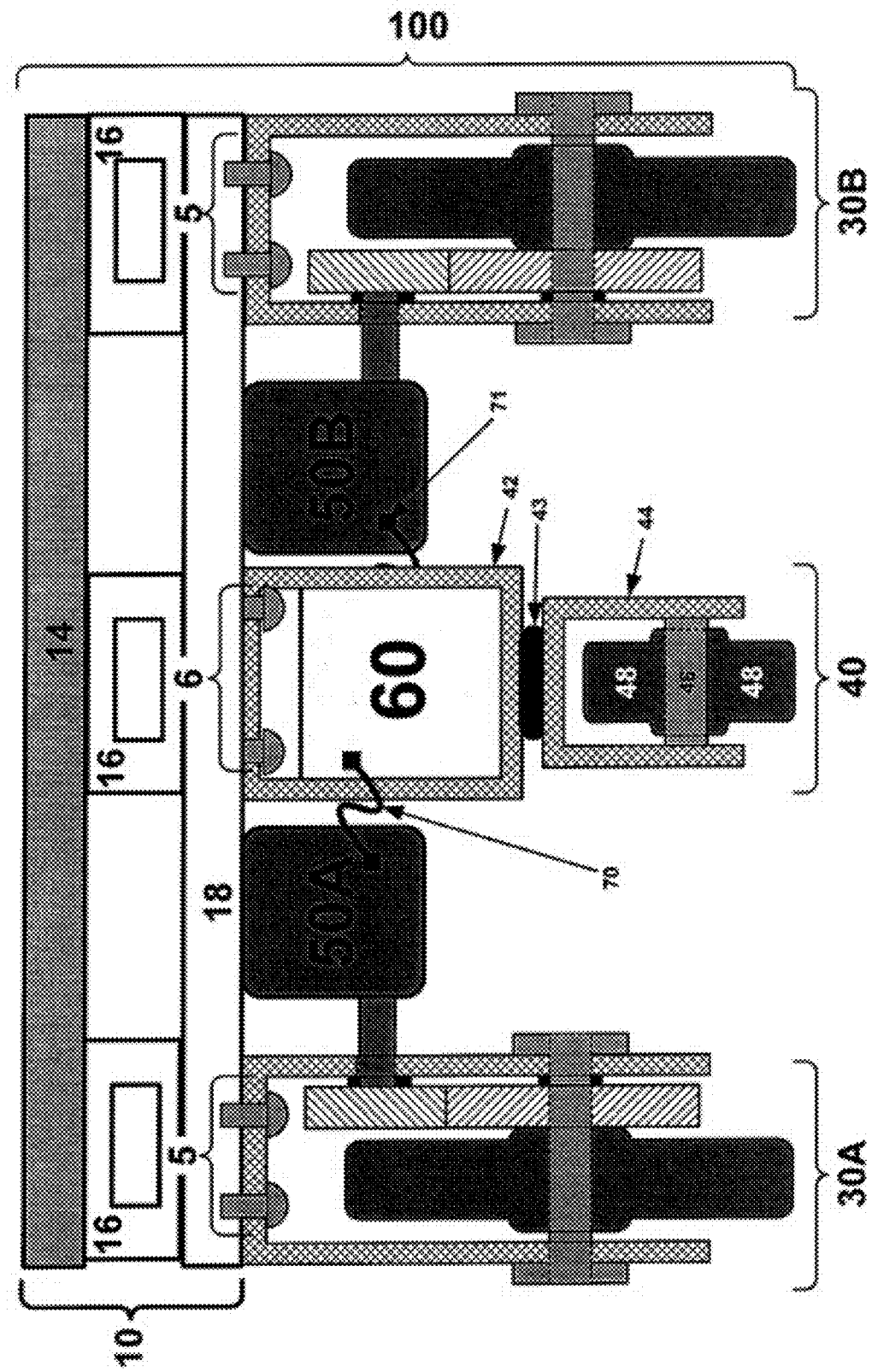
FIG. 7 illustrates another side view of another exemplary driven loadable construct.

According to the illustrative embodiment of FIG. 7 where an exemplary DLC involves a pallet 10, pallet 10 may be coupled to a pair of drive wheel assemblies 30A and 30B via couplings 5. A designated motor 50A and a designated motor 50B may provide rotation to drive the components of drive wheel assemblies 30A and 30B, respectively. Free wheel assembly 40 may be disposed between drive wheel assemblies 30A and 30B and coupled to pallet 10 via couplings 6. An exemplary free wheel assembly 40 according to the illustrative embodiment of FIG. 7 may contain a body 42 housing power source 60 and simultaneously provide rotatable coupling of wheel section 44 via revolute joint 43, which in turn, allows rotation of the operable assembly of wheel section 44, wheel 48, and axle 46. According to this embodiment, power source 60 may be dedicated to one or more motor 50. Alternatively, power source 60 may be the dedicated power source of only one of the motors 50A. As such, power source 60 may electrically coupled to motor 50A by control circuitry 70 while motor 50B electrically couples to an alternative power source (not shown) via control circuitry 71.

Where the loadable construct illustrated by FIG. 7 is a pallet 10, an exemplary driven pallet 100 may have a set of driven wheel assemblies 30A and 30B and an adequately positioned free wheel assembly 40. Such a triad arrangement of moving components may be utilized to move a pallet 10 carrying a load from one location to another by activating the motors 50A and 50B in order to rotate the wheels of the wheel assemblies 30A and 30B. By applying power to only one motor among motors 50A or 50B may permit for pivoting of DLC 100 through the use of free wheel assembly 40 and the selected stationary driven wheel. For example, a triangular arrangement of wheel assemblies 30 and wheel 40 may be deemed sufficient for use of a DLC 100. Alternatively, applying power to both motors 50A and 50B so that each wheel rotates in opposite directions may permit for pivoting of DLC 100 through use of free wheel assembly 40. While a triad of moving components are illustrated in the exemplary embodiment of FIG. 7, additional number and arrangements of free wheel assemblies and driven wheels may be coupled to pallet 10 to provide for a suitable driven pallet 100 for a given application.

Referring to FIGS. 8A, 8B, 8C, and 8D, a variety of DLCs are shown. Where an exemplary DLC is a driven pallet 100, it may have various arrangements of driven wheel assemblies 30, free wheel assemblies 40, motors 50, and power sources 60. According to the exemplary embodiment illustrated in FIG. 8A, a driven pallet 100 may comprise four driven wheel assemblies 30 powered by their respective motors 50 and sharing one or more power sources 60 via control circuitry 65. According to the illustrative embodiment of FIG. 8A, drive wheel assemblies 30 may be coupled on and across more than one component of lower deck 18 to secure drive wheel to pallet 10. Each drive wheel assembly 30 is parallel to the side 12 of driven pallet 100 and may be separated from its adjacent drive wheel assemblies 30 over the length of side 12 or over the length of face 11. According to the illustrative embodiment of FIG. 8A, power sources 60 may be coupled to lower deck 18 of driven pallet 100 by one or more power source cradle components (not shown) disclosed with respect to FIGS. 5, 6, 6A and 7. Alternatively, as shown in the illustrative embodiment of FIG. 8B, drive wheel assemblies 30 may be perpendicular to side 12 of DLC 100 while being separated from one another about the length of side 12. According to this alternative exemplary embodiment, a pair of free wheel assemblies 40 may be disposed between the pair of drive wheel assemblies 30 and placed perpendicularly to side 12 of DLC 100.

According to the illustrative embodiment of FIG. 8B, free wheel assemblies 40 may be coupled to DLC 100 in any fashion described herein. In the illustrative embodiment of FIG. 8B, free wheel assemblies 40 also serve as housings for power sources 60 which are dedicated to one of the motors 50 driving wheels of drive wheel assemblies 30. Each individual power source 60 electrically couples to its respective designated motor 50 via control circuitry 70. While as illustrated drive wheel assemblies 30 approach the edge of pallet DLC faces 11 and free wheel assemblies 40 are located closer to the center of DLC 100, it should be understood that the arrangement of these various moveable components of DLC 100 may be made to accommodate the loads to be held by DLC 100, the distances and terrain to be traversed by DLC 100, or a combination of these and other factors known to those skilled in the art With regard to the illustrative embodiments of FIGS. 8C and 8D where the DLC is a driven skid 200, a driven skid 200 may be one which utilizes drive wheel assemblies 30, power sources 60, and free wheel assemblies 40 on a skid 20 made out of a solid piece of material, for example, of the types and kinds described with respect to FIG. 2. Alternatively, in the illustrative embodiment of FIG. 8C, an alternating arrangement of drive wheel assembly 30 and free wheel assembly 40 may be appropriately placed about the underside of skid 200. According to the illustrative embodiment of FIG. 8C, free wheel assembly 40 may house power source 60 which is dedicated to one of the motors 50 driving a wheel of respective drive wheel assembly 30. Control circuitry 70 may electrically couple power source 60 to its dedicated motor 50. According to the illustrative embodiment of FIG. 8D, driven skid 200, like the driven pallet 100 of FIG. 8A, may be comprised of at least one driven wheel assembly 30 connected to one or more shared power sources 60. As illustrated, power source 60 may service the power needs of motor 50 of each of the drive wheel assemblies 30 via control circuitry 65. According to the illustrative embodiment of FIG. 8D, power source 60 may be sized to adequately power one or more of the shared motors 50 used to operate drive wheel assemblies 30. In contrast to the abovementioned triad of drive wheel assemblies 30, the illustrative embodiment depicted by FIG. 8D comprises a triad of free wheel assemblies 40 surrounding at least one drive wheel assembly 30. A motor 50C may be utilized to rotate a revolute gear assembly 78 coupling drive wheel assembly 30 to underside 20B of driven skid 200. Accordingly, controlled rotation of the operative combination of drive wheel assembly 30 and motor 50 may be achieved by motor 50C. Motor 50C may drive revolute gear assembly 78 to allow for pivoting movement of driven skid 200.

In a preferred embodiment, a wooden pallet 10 may be mounted to a steel skid 20 to maximize distribution of weight of a load on the supporting wheel assemblies 30 and/or 40. Alternatively, an exemplary wheel arrangement for a DLC 100/200 may seek to establish a low center of gravity for device stability. Accordingly, an exemplary DLC 100/200 may have all device components, such as motors, power sources, and motivation equipment stored within a driven component (such as driven skid 200) while the non-driven component (pallet 10) is mounted above the driven component without any of the device components stored within or on it.

According to the illustrative embodiment of FIG. 9A, a DLC, such as a driven pallet 100, may be supported by a series of drive wheel assemblies 30 and a series of free wheel assemblies 40, each coupled to pallet 10 via coupling mechanisms 5 and 6, respectively. As illustrated in FIG. 9A, drive wheel assemblies 30A may be coupled across a channel 19 of lower deck 18 by its wheel frame 31A with separate couplings in different portions of lower deck 18. Motor 50A may operate drive wheel assembly 30A and may be coupled around lower deck 18 and/or within channel 19, as illustrated, by an appropriately configured wheel frame 31A, or via a combination of wheel frame 31A and a coupled- or integrated-bracket 33. According to the exemplary embodiment of FIG. 9A, motor 50A may be sized or held by appropriate motor cradle 55 or other motor cradle components (not shown) to remain in operable connection with drive wheel assembly 30A. Motor 50A may be driven by one or more power sources (not shown) that are on the opposite side of free wheel assembly 40.

As illustrated in FIG. 9A, an exemplary DLC 100 may comprise a free wheel assembly 40 containing a wheel base 44 holding free wheel 48 and a body section 42 housing a power source 60 dedicated to powering a motor 50B. Free wheel assembly 40 may be sized and shaped to be coupled to lower deck 18 of pallet 10 by one or more coupling mechanisms 6, such as bolts, clamps, screws, or other coupling mechanisms known to those skilled in the art and disclosed herein.

As further illustrated in FIG. 9A, an exemplary drive wheel assembly 30B may be driven by motor 50B powered by its dedicated power source 60 held in free wheel assembly 40. Drive wheel assembly 30B and wheel frame 31B may be substantially different from drive wheel assembly 30A and wheel frame 31A, respectively, in shape and size and may be coupled to pallet 10 at various points in upper deck 14, connecting member 16, and/or lower deck 18 by one or more coupling mechanisms 5. According to the exemplary embodiment illustrated in FIG. 9A, a driven pallet system involving DLC 100 may benefit from interchangeable modularity of the moveable components such as drive wheels and free wheel assemblies. In this way, an exemplary DLC 100 may have the ability to receive further drive wheels similar or related to drive wheel assemblies 30A and/or 30B and further free wheel assemblies 40 for any particular application.

With reference to the illustrative embodiment of FIG. 9B, a DLC, such as driven skid 200, may be made from a uniform construct pallet 20, may be supported by an assortment of drive wheels, such as drive wheel assemblies 30A, 30B, or 30C and free wheel assemblies 40. As illustrated in FIG. 9B, an exemplary driven skid 200 may rest atop a drive wheel 38A operatively coupled within or on a wheel frame 31A which is then coupled directly or indirectly through a bracket via couplings 5 to underside 20B of skid 20. Drive wheel assembly 30A may be driven by motor 50A which may be coupled to the underside of skid 20 directly or with assistance from a motor cradle 55 (not shown). This type of drive wheel assembly 30A may be substituted for any other drive wheel assemblies 30 disclosed in the various embodiments to suit the purposes of the pallet to which they are coupled.

An exemplary driven skid 200 may also comprise a free wheel assembly 40 disposed between drive wheel assemblies 30A and 30C, and like free wheel assembly 40 in FIG. 9A, may also house power source 60. Free wheel assembly 40 may couple to skid 20 via couplings 6 under or through skid 20 to body part 42. In an exemplary driven skid 200, drive wheel assembly 30C may be frictionally or slidingly engaged on skid 200 on both its top surface 20A and underside 20B. According to the exemplary embodiment of FIG. 9B, an exemplary wheel frame 31C of drive wheel assembly 30C may be configured to be held substantially in place on skid 20 when a load is applied to surface 20A. By virtue of forces from the load, skid 20 may maintain frictional contact with the mouth formed by wheel frame 31C and hold drive wheel assembly 30C in place. An advantage of such a drive wheel assembly 30C may be the ready attachment and detachment from a loadable construct, such as a skid 20. A drive wheel assembly 30C may be substituted for any of the drive wheel assemblies 30 disclosed herein. Drive wheel assembly 30C may be driven by motor 50B either by electrical contact through wired hookup or through a plug-and-play type of configuration in which an exemplary drive wheel 30C may be lodged on loadable construct in a manner that substantially brings its driven wheel in contact with motor 50C. Either one or both of motors 50A and 50B may be electrically coupled to and powered by power source 60. Alternatively, each of motors 50A and 50B may have dedicated power sources 60 housed in either free wheel assemblies 40 or elsewhere on pallet 10 or 20, as shown in FIGS. 8A, 8B, 8C, and 8D.

In a preferred embodiment, two pairs of fixed drive wheels 30 are securely fastened beneath lower deck 18 of pallet 10 with mounting bolts 5 at respectively adjacent opposite ends. Drive wheel assembly 30 contains eight inch diameter drive wheels 38, motor cradle 55, and a direct current brushed motor 50 rated at twenty-four volts. The size of the motor will typically be about 3.5 inches in diameter with a length of between two to five inches depending on the power desired. Direct current brushed motor 50 is fixed securely by mounting screws 5 to motor cradle 55. Drive wheel 38 is rotatable solely within a plane of rotation around axle 22 which is mounted to wheel frame 31 via axle portion 26. Turning of the driven pallet 100 left or right is accomplished by rotating each pair of drive wheels 38 in opposite directions. The driven pallet 100 can be made to move forward or backward by turning each pair of drive wheels 38 in the same forward or reverse direction. The direct drive structure provided by gear reduction and independent motors 50 allows for precise control and a low-turning radius for steering the pallet 100.

In another preferred embodiment, a cost reduction is achieved by replacing one pair of drive wheel assemblies 30 with two, less-expensive free-rolling caster wheel assemblies 40 containing five inch diameter caster wheels 48. As shown in FIGS. 7, 8B, 8C, 9A, and 9B, each caster wheel assembly 40 is securely fastened to lower deck 18 of pallet 10 or securely fastened to underside 20B of skid 20 with mounting bolts 6. Eliminating one pair of drive wheel assemblies 30 allows for further cost reduction by reducing power requirements to drive wheels 38. According to this preferred embodiment and with reference to FIG. 11, the power source 60 consists of two twelve volt gel type batteries. In this embodiment two twelve volt batteries are connected in series and are used to supply operating voltage for two direct current, twenty-four volt motors 50. According to the aforementioned preferred embodiment, two pairs of drive wheel assemblies 30 are designed to move an 800 pound pallet load at three miles per hour on a flat surface for 3 hours before battery recharging is required. While four twelve volt batteries have been illustrated, those skilled in the art may recognize reduction or increase in the number of batteries depending on any of the design considerations disclosed herein. For example, where only two driven wheel assemblies 30 are to be used, an exemplary driven pallet 100 or driven skid 200 may require only two batteries instead of four.

As disclosed, an existing loadable construct such as conventional wood, metal, paper, or plastic pallet 10 can be retrofitted so that it becomes driven. Also, a skid 20 may also be manufactured to accommodate the coupling of driving components as described herein. This is accomplished by attaching a power source 60, motor drive circuitry (as may be illustrated and described with respect to FIG. 11), power source recharge circuitry (as may be illustrated and described with respect to items 1020 and 1070 of FIG. 11), at least one motor 50 for producing rotational energy, and a combination of one or more drive wheel assemblies 30 and, optionally, one or more free wheel assemblies 40 to a conventional wood, metal, paper, or plastic pallet 10. In addition, rotational energy from at least one motor 50 may be controllably coupled to at least one drive wheel assembly 30. The number of drive wheel assemblies 30 and free wheel assemblies 40 required in order to move pallet 10 forward, backward, left, or right at a desirable speed may depend on the specific size, physical shape, material, loading characteristics, and design of the pallet 10 or skid 20 being retrofitted. In addition, any drive wheel assembly 30 or free wheel assembly 40 may be engineered to be either fixed or steerable dependent on the specific size, physical shape, material, loading characteristics, and design of the pallet 10 or skid 20 being retrofitted. The method of retrofitting such a conventional pallet 10 or skid 20 may be easily and cheaply incorporated without significant change to current conventional wood, metal, paper, or plastic pallets.

Rather than retrofitting a conventional pallet 10, a driven pallet 100 can be manufactured to take the place of a conventional wooden, metal, paper, or plastic pallet 100 commonly seen in a manufacturing or warehouse operation. The body of the pallet 10 supports the material to be transported as well as a power source 60, power source recharge circuitry, as may be shown by items 1020 and 1070 in FIG. 11, and a combination of one or more drive wheel assemblies 30 and/or free wheel assemblies 40.

In another preferred embodiment, free rolling wheel assemblies 40 consist of freewheel braces 44 holding caster wheels 48 that are pivotally mounted to battery holder 42. Swiveling wheel section 41 allow skid 200 to be turned easily while all of the drive wheel assemblies 30 remain on the ground. Additionally, a load cell or other sensor can be attached to pallet/skid 100/200 along with associated electronics so that net, tare, and gross weight can be displayed and printed along with time and date of weighing.

In yet another embodiment, slits may be cut into upper deck 14 of conventional pallet 10/20 creating additional channels 15 in which drive wheels 38 of a similarly designed pallet 10/20 may rest, allowing for the stable stacking of driven pallets/skids 100/200 onto a similarly designed pallet 10 or skid 20.

Other types of motors 50 such as gearmotors, brushless motors, or stepping motors may also be used. Additionally, motors 50 may be rated at other voltages such as twelve volts or thirty-six volts and may not contain a gearhead. It will be understood by those skilled in the art that other types of power sources 60 may be used such as deep cycle, lithium ion batteries. Additionally, the numbers of batteries required may vary. Furthermore, batteries may be rated at other voltages such as six, twenty-four, or thirty-six volts.

It will be appreciated by those skilled in the art that many variations of the DLC 100/200 are possible without departing from the spirit and scope of the disclosed embodiments. For example, the number of drive wheel assemblies 30 and free-rolling wheel assemblies 40 required in order to move the pallet/skid 100/200 forward, backward, left, or right at a desirable speed will vary and is dependent on the specific size, physical shape, material, loading characteristics, and design of the pallet being either retrofitted or manufactured.

With reference to the illustrative embodiment of FIG. 10, a DLC such as pallet/skid 100/200 may comprise rotatable drive wheels 38 and wheel frames 31 coupled to the pallet 10 or skid 20 and one or more free wheel 48 coupled to wheel bases 44 rotatably coupled to bodies 42 which are coupled to pallet 10 or skid 20. Motors 50 may be coupled to either of pallet 10 or skid 20 and/or wheel frame 31 may be electrically coupled to one or more power sources 60, as described herein in other illustrative embodiments. According to the illustrative embodiment of FIG. 10, motors 50 may be electrically coupled via control circuitry 81 to control unit 80 for controlling signals sent to motor drive circuitry and motor 50 from power source 60. An exemplary controller 80 may comprise a directional control 82 and one or more operative controls 84, 86, and 88. An exemplary directional control 82 may be a joystick, a key pad, a touch screen, or a scrolling dial. Operative controls 84, 86, and 88 may be "ON" or "OFF" buttons, may activate a sound or visual signal during operation of DLC 100 or 200, may change a function of operation of motor 50, power source 60, or a combination of motors and power sources. Alternatively, operative controls for any of the components of DLC 100 or skid 200 may be directly or indirectly located on or within the DLC 100/200. Alternatively, an exemplary power source 60 according to the illustrative embodiment of FIG. 10 may be electrically coupled via control circuitry 91 to a control unit 90. Like control box 80, control unit 90 may comprise directional control 92 and operative controls 94, 96, and 98. Control unit 90 may have the same or similar functions and operates connections as control unit 80.

In a preferred embodiment, a controller may comprise a series of individual push-buttons in a matrix to form a keypad. Each button may be dedicated to a different pallet movement, for example, a button dedicated to sending a "forward" signal to the motors 50 attached to the drive wheel assemblies 30 and a button dedicated to sending a "backward" signal to the motors 50 attached to the drive wheel assemblies 30.

Further according to the preferred embodiment, an executed command may be displayed on a seven segment, light emitting diode display, for example, a dot matrix display illuminating the letters of the words "FWD" for the forward signal execution and "BWK" for the backward signal execution. Accordingly, such a preferred embodiment of a controller 80 may be coupled to DLC 100/200 via a ribbon cable. As per this preferred embodiment, a microprocessor is used to determine the keypad button being pushed by the operator, light up the correct command on the seven segment or dot matrix LED display, and implement the command. Use of pulse width modulation (PWM) may be used to communicate externally to and from the microprocessor via a card cage electronic holder coupled to the DLC 100/200 for the microprocessor electronics and PWM circuitry. Alternatively, an 8051 microcontroller may be used for internal PWM communications.

In another preferred embodiment, controller 80 may include an actual keypad to control the DLC 100/200. In this preferred embodiment, control electronics that may have been stored in a card cage electronic holder on the DLC 100/200 may be moved to the controller or control box 80. According to this preferred embodiment, digitized commands for moving the device forward or backward may result in the display of "FWD" and "BWK", for example, on a dot matrix LED display within control box 80. Motor control circuitry 1030 and 1040 according to this preferred embodiment could be designed using a relay motor drive printed circuit board. Such exemplary relay motor driver boards may be provided for each motor 50 coupled to a driven wheel assembly 30 in or around the lower deck/underside of DLC 100/200.

Figure 11:
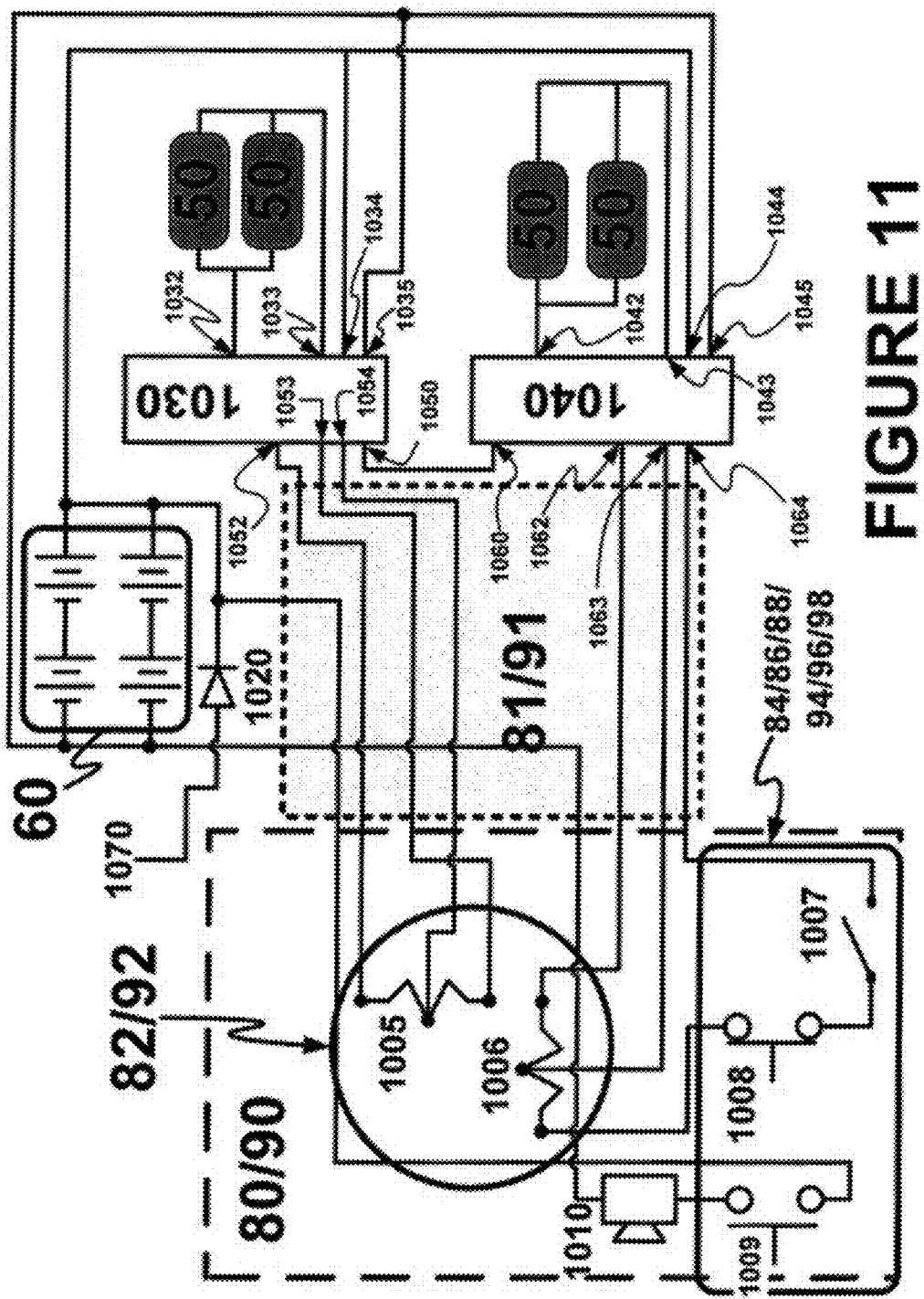
FIG. 11 illustrates an exemplary electrical schematic of an exemplary controller for an exemplary driven loadable construct.

In the illustrative embodiment of FIG. 11, an exemplary control unit schematic 80 or 90 may be shown. As shown in FIG. 11, directional control 82/92 may be a group of potentiometers 1005, 1006, whose variation in resistance is communicated as signals to motor cards 1030 and 1040, respectively. Operative controls 84, 86, or 88 and 94, 96, or 98 may be circuit breaking buttons 1008, 1007, and 1009 whose closing of the circuit permits either activation of brakes, visual or audible signs (e.g., siren 1010), on-off activation (e.g., switch 1007) or other potential activities which are readily programmable by persons of ordinary skill in the art.

In a preferred embodiment, controller 80/90 contains a safety horn 1010, safety horn push button switch 1009, On-Off switch 1007, and brake push button 1008. Safety horn 1010 is activated while safety horn push button switch 1009 is depressed. Power for activating safety horn 1010 is received through direct connection by way of umbilical cable 81/91. Deactivation of on-off switch 1007 or brake push button 1008 sends a signal to motor drive circuitry 1030 and 1040 commanding the motors to cease rotating drive wheels 38. Through pulse width modulation an average value of voltage and current is applied to drive wheels 38 at a frequency of 21.77 kilohertz as long as brake switch 1008 is closed and On-Off switch 1007 is closed. If either switch becomes open or umbilical cable 81/91 is disconnected, the error condition is detected at 1050 and 1060 by motor controller card 1030 and 1040, respectively, and all motors 50 cease to rotate drive wheels 38.

Control circuitry 81/91 may be leads from the joystick to the various motor cards disposed within or near motors 50. As illustrated in FIG. 11, power source 60 may comprise one or more batteries or cells, suitable for driving motors 50 for the particular application. As disclosed herein, in the case of a rechargeable power source 60, a diode or similar current restrictive element 1020 may be used to supply recharge voltage across power source 60 from a recharge source 1070 such as an outlet or generator (not shown). Exemplary control circuitry 81/91 from control unit 80/90 may therefore couple electrically to both power source 60 and motors 50. Alternatively, separate controllers 80 and 90 may be employed depending on the circumstances.

Also, control unit 80/90 containing directional device 82/92 may include a pointing device other than a joystick such as switches. Alternatively, control circuitry 81/91 may be wireless using a radio frequency, infra-red, touch tone, voice activated, or other electronic link such as a GPS signal or an application running on a cell phone, smart phone, or computer-like device in order to control movement of DLC 100/200. In addition, net, tare, and gross weight can be displayed on the control box or on the body of the pallet itself.

In a preferred embodiment, control unit 80/90 includes analog joystick 82/92 and interfaces with coiled umbilical cable 81/91. Control unit 80/90 is constructed from a phenolic instrument case and measures on the order of 3.75 inches by 6.25 inches by 2 inches. Instrument cases of this type are sold by Keystone Electronics Corporation of Astoria, N.Y. Analog joystick 82/92 is manipulated under operator control in order to command the DLC 100/200 forward, backward, left, or right at a desirable speed. The body of analog joystick 82/92 is rotated forty-five degrees before being physically mounted within control unit 80/90.

In another preferred embodiment, analog joystick 82/92 consists of two 5000 ohm potentiometers 1005 and 1006. Pivoting the position of the joystick varies the amount of resistance in each potentiometer thereby translating the joystick's physical position into an electrical signal. Thus, the amount of pulse width modulation applied to motors 50 is precisely controlled through direct human manipulation of analog joystick 82/92. Coiled umbilical cable 81/91 is an eight position seven foot long modular cable. Modular cables of this type are sold by Assmann WSW Components of Tempe, Ariz. Umbilical cable 81/91 provides a direct electrical connection between joystick 82/92 and motor drive circuitry 1030 and 1040. Motor drive circuitry 1030 and 1040 include model number 24v12a motor controller printed circuit card manufactured by Pololu Corporation of Las Vegas, Nev. The printed circuit cards 1030/1040 perform bidirectional control of brushed direct current motors 50. Initial setup of the printed circuit card is performed through a Windows interface via a universal serial bus (USB) link. The printed circuit card uses the technique of pulse width modulation in order to control the amount of power applied to rotate wheels 38. In addition, the error lines 1050 and 1060 of both motor drive circuitry cards 1030 and 1040, respectively, are tied together so that all motors are commanded to stop when either card experiences an error. Each printed circuit card can supply a continuous current of twelve amperes without a heat sink and directly interfaces with analog joystick 82/92.

In a preferred embodiment, the power source 60 includes four twelve volt, twenty-six ampere-hour self-contained gel type rechargeable batteries. Each battery measures on the order of 6.5 inches by 7 inches by 5 inches. Batteries of this type are sold by the Power-Sonic Corporation of San Diego, Calif. Each battery is securely held in place with a battery holder (or power source cradle 42 and recharged by way of battery recharge circuitry 1020 and 1070. In a preferred embodiment according to the illustrations of FIG. 11, power source 60 may comprise two pairs of twelve volt batteries connected in series with each pair of batteries then connected in parallel in order to supply operating voltage for two pairs of direct current twenty-four volt motors 50 that are connected in parallel. As shown in the illustrative embodiments in FIGS. 5, 7, 8A, 8B, 8C and 8D, motors 50 are securely mounted to the same side 12 of pallet 10 or skid 20. Each battery is securely fixed to lower deck 18 of pallet 10 or underside of skid 20 in a suitable cradle 42.

In yet another preferred embodiment, motor drive circuitry card 1030 and 1040 is a twenty-four volt Pololu simple motor controller. Each motor drive circuitry card 1030 and 1040 is electrically connected to drive one direct current twenty-four volt motor 50.

Exemplary motor card 1030 may comprise numerous inputs 1052, 1053 and 1054 for receiving signals generated at joystick 82/92 and output 1050 for generating an error signal and stopping motor 50 when something is going wrong with the controller. According to the illustrative embodiment of controller circuitry in FIG. 11, motor card 1030 may have inputs from potentiometer 1005 for a negative potentiometer signal at 1052, a positive potentiometer signal at 1053, an output from the potentiometer 1054, and an error signal at 1050. According to the illustrative embodiment, potentiometer signals at 1052, 1053, and 1054 may also serve a feedback function for the operator's use of motors 50 coupled to one or more of the motor drive circuitry cards 1030/1040. Thus, if the pallet/skid 10/20 is not traveling at a desirable speed or in a desirable direction, an operator may correct speed and direction of the pallet/skid 10/20 via appropriate operation of control unit 80/90.

In accordance with the exemplary embodiments illustrated by FIG. 11, as motors are supplied power from power source 60, motor card 1030 outputs a pulse modulated signal into 1032 and 1033. Motor card 1030 receives signals from power source 60 via 1034 and is grounded via 1035. Similar to operation of potentiometer 1005 with motor card 1030, potentiometer 1006 operates with motor card 1040 to provide negative and positive potentiometer signals 1062 and 1064, respectively, and also an output potentiometer signal 1063. An error signal is communicated from motor card 1040 at 1060 and which is ultimately connected to motor card 1030 to stop all motors in the event an error is detected. Similar to the motors 50 coupled to motor card 1030, motors 50 coupled to motor card 1040 also provides an output, such as pulse width modulation (PWM), to 1042 and 1043. Motor card 1040 receives voltage from power source 60 via 1044 and is grounded via 1045.

While the illustrative control circuitry illustrated in FIG. 11 may be one form of controlling exemplary motors 50 and exemplary power sources 60, other methods of sending signals to motors to control movements while responding to changes in activity are known and understood by persons of ordinary skill in the art. For example, motor drive circuitry may be installed on DLC 100/200 for the control and transmission of signals to the various moving components of the DLC 10/20, for example motor cards 1030 and/or 1040. Further, while control circuitry 81/91 may be embodied in hard wires and cables between controller 80/90 and pallet 100 or skid 200, control circuitry 81/91 may also be embodied by wireless connections such as infrared, radio wave, Bluetooth or 802.11g/b/n. Those skilled in the art would understand other suitable wireless technologies that provide equivalent functionalities to the analog technologies provided for by these disclosures.

In a preferred embodiment, a manufactured driven skid 200 includes motor controllers 1030 and 1040, control unit 80, power source 60, two drive wheel assemblies 30, and two free rolling caster wheel assemblies 40. Motor controllers 1030 and 1040 may be printed circuit cards manufactured by Pololu Corporation of Las Vegas, Nev. and may permit bidirectional control of brushed direct current motor 50. Preferably, the body of skid 20 may support the material to be transported and may be constructed from one eighth inch thick aluminum diamond plate cut in the shape of an octagon and measures twenty-four inches by twenty-four inches. The manufactured driven skid 200 will fit through a standard United States residential door having a width of thirty-six inches. Preferably, power source 60 consists of two twelve volt twenty-six ampere-hour sealed rechargeable gel type batteries connected in series as shown in FIG. 11.

In a preferred embodiment, two pairs of fixed drive wheel assemblies 30 utilizing 36-volt gearmotors 50 will move a pallet 100 load weighing slightly more than 1000 pounds at three miles per hour on a flat surface for 3 hours before battery recharging is required.

In an exemplary method for constructing a pallet/skid 10/20 to be driven, a first step may include selection of a desired shape for the pallet/skid 10/20. In one aspect, a retrofitting of a plastic/wood pallet 10 may be limited by predetermined dimensions, such as, for example, those found in the Uniform Standard for Wood Pallets, National Wooden Pallet and Container Association, Alexandria, Va. In another aspect, an exemplary pallet/skid 10/20 may be needed to fit through a standard interior door with dimensions between approximately 30 inches to 34 inches in width or both interior and exterior doors, in which case the dimensions for exterior doors will usually be wider. An exemplary shape for an exemplary pallet/skid 10/20 may be an octagon, which may be formed of eight interior angles at 135 degrees. An exemplary octagon skid 20 may have all its eight sides being 10 inches in length and an apothem of approximately 12.0711 inches.

In an exemplary method for constructing a pallet/skid 10/20 to be driven, a second step may include selection of driven wheel assemblies 30 and free wheel assemblies 40. Considerations for selection of the driven wheel assemblies 30 and free wheel assemblies 40 may include, but are not limited to, the following: maximum required pallet/skid 10/20 load, maximum required pallet/skid 10/20 load at the maximum desired speed, a desired maximum amount of time of load bearing, the amount of time before one or more power sources 60 require replenishment, e.g., recharging of batteries, and surface on which pallet/skid 100/200 is expected to travel.

In a preferred embodiment of the aforementioned method, a design consideration may include DLC 100/200 stability. According to this preferred embodiment, a group of four drive wheel assemblies 30 may be selected to provide enhanced stability. In another preferred embodiment of the aforementioned method, a design consideration may include cost of the DLC 100/200. Additionally, as part of the design consideration, cost is reduced if the number of driven wheel assemblies 30 is reduced. According to the preferred embodiment of a method where an octagon shaped skid 20 is selected, two driven wheel assemblies 30 and two free wheel assemblies 40 may be coupled to the skid 20.

In an exemplary method for constructing a pallet/skid 10/20 to be driven, a third step may include identifying the force required to move DLC 100/200 on a specific type of surface while holding a load. According to one aspect of this third step of the exemplary method, DLC 100/200 may be tethered to a stationary object and subjected to testing utilizing instrumentation known to those skilled in the art to measure the force required to move a particular load placed upon the DLC 100/200. For example, a DLC 100/200 may be loaded with a maximum weight, placed on a surface on which the DLC is expected to travel, and then measured by use of a spring scale an amount of force to overcome friction between the drive wheel assemblies 30, free wheel assemblies 40, and the surface.

According to the preferred embodiment of an octagon-shaped driven skid 200, a required force for moving a loaded, driven skid containing two driven wheels and two free wheel assemblies on a concrete surface may be experimentally determined to be related by the following equation: F≈Load/20, where "F" is the force in pounds required to overcome friction between the two drive wheel assemblies 30, two free wheel assemblies 40, and the concrete surface of an exemplary octagon-shaped driven skid 200, "Load" is the weight in pounds of whatever is to be placed on and moved by an exemplary octagon-shaped driven skid 200.

According to the exemplary method for constructing a pallet/skid 10/20 to be driven, a fourth step may include determining an amount of torque to be generated by each drive wheel assembly 30 to move a load atop DLC 100/200. In an exemplary method, the torque required is based on the reading obtained on the spring scale and wheel radius.

According to the exemplary method for constructing a pallet/skid 10/20 to be driven, a further step in conjunction with the fourth step or as a separate fifth step may include selection of a drive wheel 38 radius. According to this exemplary method, a larger drive wheel 38 radius may require greater torque and a more powerful motor 50 in order to rotate drive wheel 38. However, a larger drive wheel 38 radius may also provide greater traveling distances for the DLC 100/200 for each revolution of the drive wheel 38.

In a preferred embodiment, of the octagon-shaped driven skid 200, an 8 inch diameter drive wheel may be selected and the torque required per drive wheel determined by the following calculations: T≈(r*F)/n, where "T" is the torque required in foot-pounds for each n drive wheel 38 of "r" radius in feet. "F" is the measured force in pounds as measured on the spring scale to move the pallet and its load.

According to the exemplary method for constructing a pallet/skid 10/20 to be driven, a further step may include identification of maximum speed of travel of an exemplary DLC 100/200. A preferred target speed may be approximately the speed of human walking, such as, for example, 3 miles per hour.

A further step of an exemplary method for constructing a pallet/skid 10/20 to be driven may also include optimizing the amount of torque per second to be provided to each drive wheel 38 from motor 50 to achieve a desired target speed.

In a preferred embodiment, an optimal torque per second to be applied to each wheel n of a two drive wheel, octagon-shaped driven skid 200 may be related according to the following equation: "T" per second=(maximum desired target speed)*(2)*(π)*(required torque), where "T" is the torque required in foot-pounds per second for each n drive wheels 38 having a maximum desired target speed in revolutions per second and a required torque in foot-pounds for each n drive wheels 38 so that friction is overcome between the two drive wheel assemblies 30, two free wheel assemblies 40, and the concrete surface of an exemplary octagon-shaped driven skid 200.

A further step of an exemplary method for constructing a pallet/skid 10/20 to be driven may also include optimizing the motor 50 to meet the drive requirements of the DLC 100/200. An exemplary 24 volt motor from Lesson Corporation may supply 15 inch-pounds of torque at 300 RPM and requires 3.8 amps. Such an exemplary motor 50 rotating each drive wheel 38 may be used to move 400 pounds at 3 miles per hour using the 8 inch diameter wheels on a driven, octagon-shaped skid 20.

In conjunction with motor 50 selection, the exemplary method may also include selection of power source 60. According to an exemplary power source selection step, optimization of power source 60 may include selecting a power source having the greatest number of ampere-hours possible contained in the smallest and/or lightest specifications available.

While the above is an exemplary method for constructing a pallet/skid 10/20 to be driven, each of the steps may be repeated and re-ordered as required and/or the results of each step be calculated through iterative analysis.

A further embodiment of an exemplary motive construct or DLC 300 will now be described with reference to FIG. 12-12A.

Figure 12:
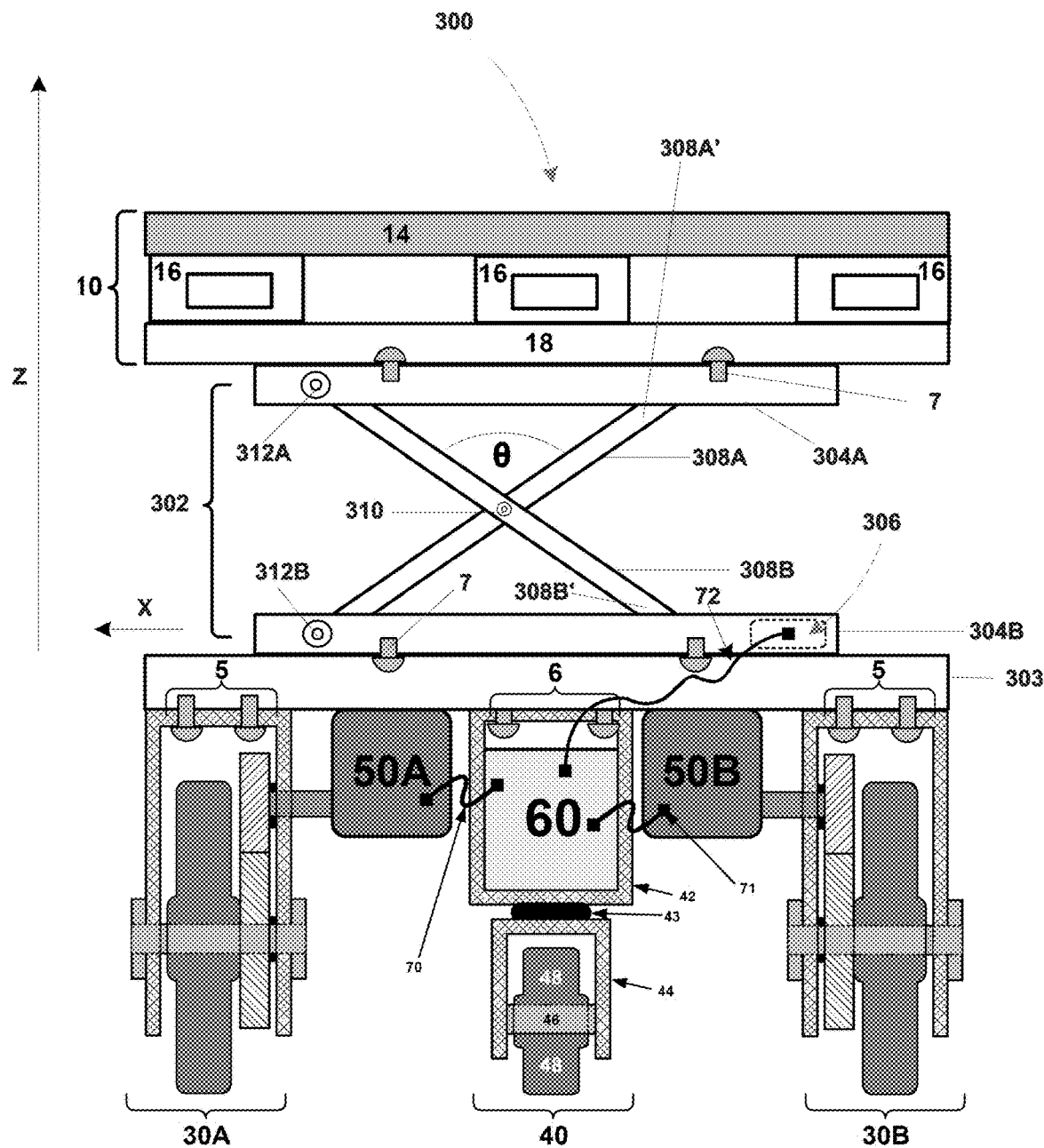
FIG. 12 illustrates a side view of another exemplary driven loadable construct including a lift mechanism in accordance with the present disclosure.

The DLC 300, as shown in FIG. 12, may include substantially the same features as discussed above with respect to the DLC 100/200 except in the ways noted hereinbelow.

Unlike the DLC 100/200 described hereinabove, the pallet 10 of the DLC 300 may be configured to move in or against a generally vertical direction as indicated by directional arrow Z with respect to a platform 303. A lower surface of the platform 303 may be coupled to the drive wheel assemblies 30A and 30B via the couplings 5 and coupled to the power source 60 via couplings 6. An upper surface of the platform 303 may be coupled to a lift mechanism 302. The lift mechanism 302 may be configured to adjust the height of pallet 10 relative to the platform 303. The lift mechanism 302 may be any suitable mechanism for adjusting a distance or a height, for example the lift mechanism may include: a scissor lift, a screw jack, an electric cylinder, a linear actuator, a hydraulic actuator, a hydraulic jack, a hydraulic cylinder, a pneumatic cylinder, a cable cylinder, a track cable cylinder, a pulley actuator, a rail air actuator, a linear slide, a band cylinder, a magnetic linear cylinder, a magnetic linear slide, a magnetic linear thruster, or a guided air cylinder, any combinations thereof, or the like.

In the exemplary embodiment as showing in FIG. 12, the lift mechanism 302 is a scissor lift. The scissor lift may, for example, be of the type manufactured by K & L Supply Company of Santa Clara, Calif., which is rated for 1,100 pounds and raises to a height of 13 inches. However, other suitable scissor lift mechanisms may be used instead.

As shown in FIG. 12, the scissor lift 302 includes an upper plate 304A and a lower plate 304B. The lower plate 304B may be coupled to the platform 303 via the couplings 7. The upper plate 304A may be coupled to the pallet 10 via couplings 7. The plates 304A and 304B may be configured to have an adjustable distance therebetween. A pair of scissor arms 308A and 308B may couple the plates 304A and 304B to one another. The pair of scissor arms 308A and 308B may be pivotably connected to one another via a pivot pin 310. A first end of the scissor arm 308A may be pivotably connected to a stationary pivot pin 312B disposed on the lower plate 304B and a second end 308A' of the scissor arm 308A may be slidably coupled within a track (not shown) disposed lengthwise along the upper plate 304A. Similarly, a first end of the scissor arm 308B may be pivotably connected to a stationary pivot pin 312A disposed on the upper plate 304A and a second end 308B' of the scissor arm 308B may be slidably coupled within a track (not shown) disposed lengthwise along the lower plate 304B. Sliding of the second end 308A' of the scissor arm 308A and the sliding of the second end of the 308B' of the scissor arm 308B in a direction toward the stationary pivot points 312A and 312B, respectively, causes the angle 9 to decrease, thereby causing a corresponding increase in the height of the pallet 10 as the upper plate 304A is urged away from the lower plate 304B and the upper plate 304A moves in the direction of arrow Z.

Figure 12A:
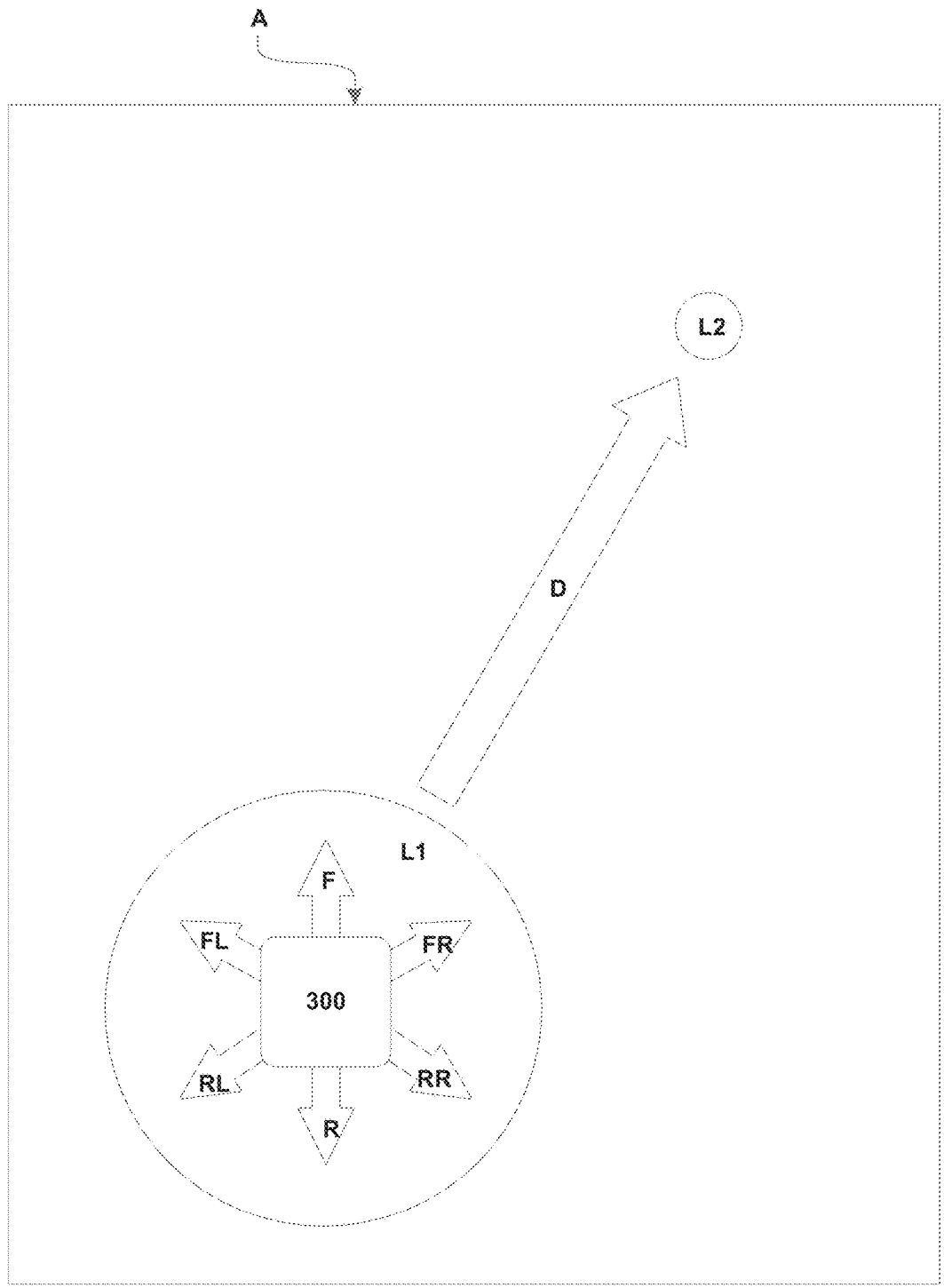
FIG. 12A is an illustration of steering of the exemplary driven loadable construct of FIG. 12 between two locations within an area as seen from a top view.

As shown in FIG. 12A, the DLC 300 may be steered within an area A from a first geographic location L1 to a second geographic location L2 or any other location within the area as the DLC 300 moves generally in a direction D. The DLC 300 may be steered by moving the DLC 300 in a forward direction F or a rearward direction R. By controlling the relative speed of movement and/or direction of rotation of the respective wheels of the drive wheel assemblies 30A and 30B and/or controlling the rotative position of the free wheel assembly 40 (i.e. turning of the revolute joint 43), for example, steering the DLC 300 left or right and achieving a forward/leftward movement FL, a forward/rightward FR, a rearward/leftward movement RL, or a rearward/rightward movement RR, as well as movement in intermediate directions between the ones noted, may also be achieved. In addition to steering of the DLC 300 in these directions, a height of the pallet 10 relative to the platform 303 may be achieved as discussed above by actuating the lift mechanism 302, thereby adjusting and moving the position of the pallet 10 by moving it in or against the direction indicated by arrow Z (FIG. 12).

A motor 306 may be configured to provide a drive force to urge the second end 308B' of the scissor 308B to slide in the direction of arrow X toward the stationary pivot point 312B, thereby causing the scissor lift to increase in height in the manner discussed above. The motor 306 may be electrically coupled to power source 60, for example where the motor 306 is an electrical motor such as a DC motor, via control circuitry 72. Although as shown, the lift mechanism 302 is operatively coupled to the motor 306, the lift mechanism 302 may alternatively be operatively coupled to at least one of the motors 50A and 50B, for example via a transmission (not shown), and/or the lift mechanism 302 may be powered by the power source 60.

Furthermore, although illustrated in FIG. 12 as being part of the lift mechanism 302, the motor 306 may be separate from the lift mechanism 302 and the motor 306 may be operatively coupled to the lift mechanism 302 via a transmission (not shown) to provide motive force to the scissor arms 308A and 308B. Also for example, the lift mechanism 302 may be operatively coupled to the motor 306 via one or more gears, chain assemblies, belt assemblies, sprockets, motor coupler, the like, and/or any combination thereof. Preferably, it may be desirable to provide a smoothly operating, substantially vibration free, lift mechanism 302 which may substantially retain precise alignment between any gear or driving gear operatively coupling the lift mechanism 302 and the motor 306.

Exemplary control circuitry 72 may include wire leads, cables, plugs, or any form of electrical leads known to those skilled in the art that provide for power from the power source 60 to reach an exemplary motor 50A, 50B. The controller 80 may be further configured to operably control the lift mechanism 302. Suitable circuitry for implementing operations of the lift mechanism 302 may be provided and coupled to the lift mechanism. Such circuitry, which may include a processor and a memory, may be configured to communicate with the controller 80 via wired or wireless connection for example. The controller 80 may be a remote controller, in other words the controller 80 may be operated from a location that is remote from the location of the DLC 100/200/300 and may also be handheld. As discussed above, the controller 80 may be operatively connected to the DLC 100/200/300 via a cable (e.g. a ribbon cable, a Cat5e cable, a coiled or straight modular telephone cable RJ12, or the like) or a suitable wireless protocol including for example WiFi (e.g. 802.11g/b/n/ac), BLUETOOTH, IEEE 802.15.4, infrared, radio wave, any combinations thereof, or the like.

Figure 13A:
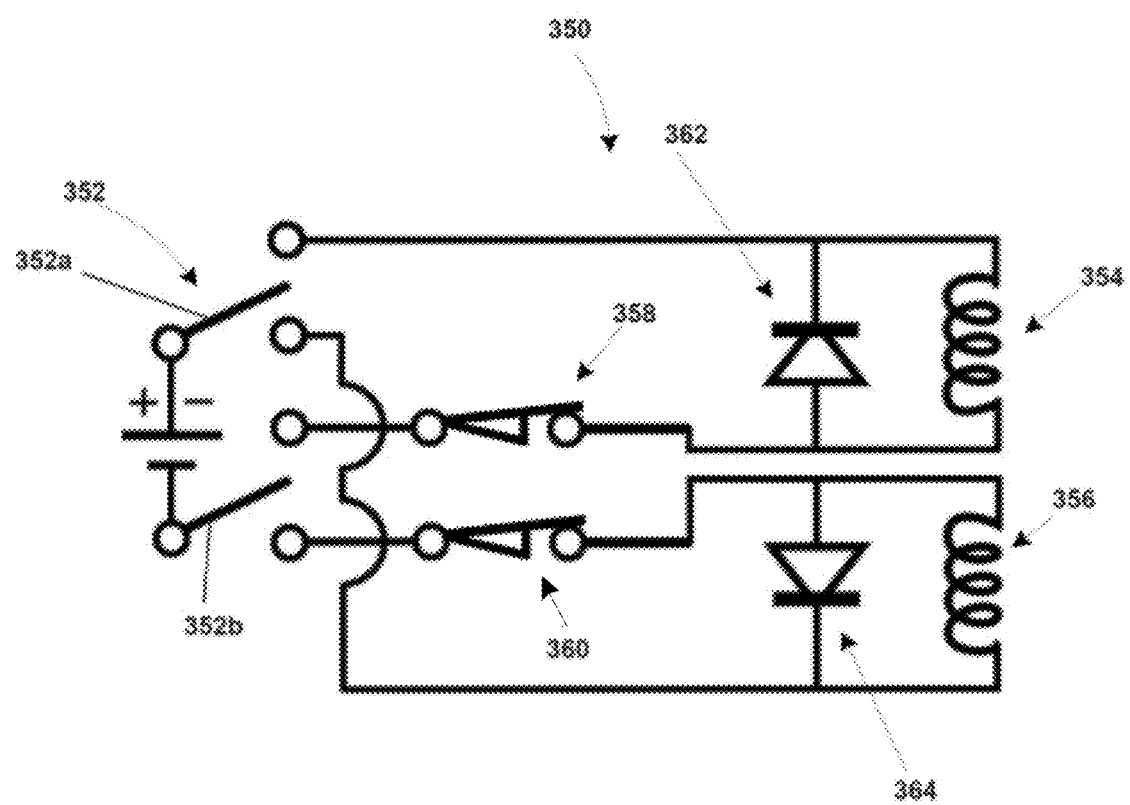
FIG. 13A is a schematic of a remote controller in accordance with the present disclosure.

The controller 80 may include designated circuitry for controlling the operation of the lift mechanism 302. As shown in FIG. 13A, lift controller circuitry 350 is depicted. The controller 80 may additionally or alternatively include the lift controller circuitry 350. In particular, the lift controller circuitry 350 may include an Up/Down directional control 352 that may be a double pole double throw (DPDT) center off rocker switch. In particular, the Up/Down directional control switch 352 may include a first switch 352a for effecting an Up signal to be transmitted and a second switch 352b is for effecting Down signal to be transmitted. During operation, an Up position of the switch 352 may be communicated to relay 354 having 1 Form A contacts. Similarly, during operation, a Down position of the switch 352 may be communicated to relay 356 having 1 Form A contacts. A neutral centered position of the switch 352 between the Up and Down positions would result in neither an Up nor a Down signal to be transmitted by the controller and may result in the lift mechanism 302 being stopped at its then current position. The switch 352 may be, for example, the R5 series switch manufactured by E-Switch.

A flyback diode 362 provides a path for current when relay coil 354 is no longer energized. Flyback diode 364 provides a path for current when relay coil 356 is no longer energized. Both diodes 362, 364 may help to prevent or inhibit voltage spike arcing, which may be advantageous because voltage spike arcing can degrade relay lifetime.

Figure 13B:
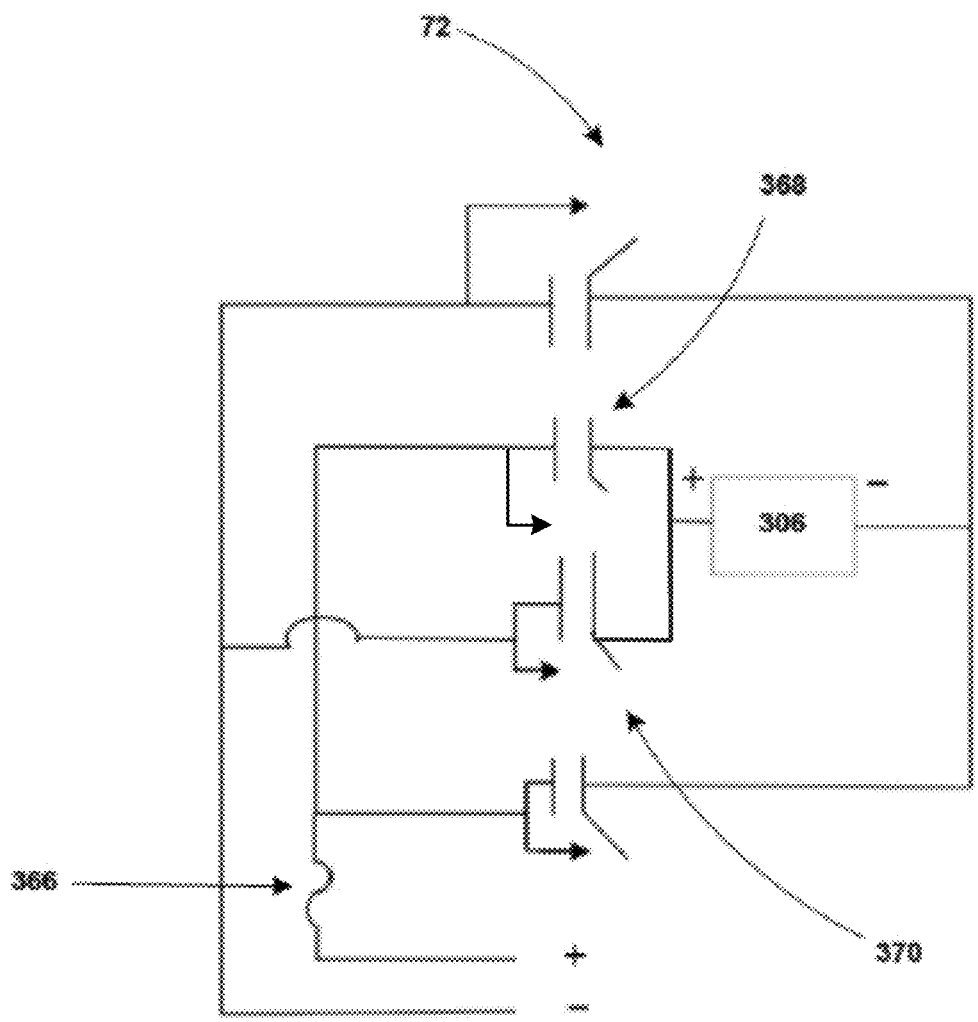
FIG. 13B is a schematic of control circuitry operatively coupled to a motor and configured to communicate with the remote controller of FIG. 13A.

The control circuitry 72 of the motor 306 is depicted in FIG. 13B. The control circuitry 72 may be configured to communicate and receive operational control signals from the controller 80 and its lift controller circuitry 350. There may be two-way communication between control circuitry 72 (FIG. 13B) of the DLC 300 and the remote controller circuitry 350 (FIG. 13A) such that the remote controller circuitry 350 may receive a signal that the pallet 10 has achieved a maximum or a minimum allowable height and will no longer send a signal to cause the pallet 10 to move in that direction.

Alternatively, although discussed as being integrated into the controller 80, the lift controller circuitry 350 may instead be electrically coupled to the control circuitry 72 controlling the operation of the lift mechanism 302, and may be physically disposed on the DLC 300 itself as opposed to on any remote controller. In other words, the steering of the DLC 300 may be operated via a remote control, whereas the lift mechanism 302 may be operated and the height (i.e. up/down position) of the pallet 10 may be controlled by one or more designated buttons operatively and physically coupled to the DLC 300 itself. However, in other embodiments, a remote controller such as the controller 80 may operate and control both the steering of the DLC 300 and the height (i.e. up/down positioning) of the pallet 10.

Referring again to FIG. 13A, an Up limit switch 358 may be configured to communicate with the motor 306 of the lift mechanism 302 to cut power to the motor 306 when the pallet 10 coupled to lift mechanism 302 is at a predetermined maximum allowable height and when the directional control 352 is in the Up position and would otherwise attempt to continue to increase the height. Similarly, a Down limit switch 360 may be configured to cut power to the motor 306 when the pallet 10 coupled to lift mechanism 302 is at a predetermined minimum allowable height and the directional control 352 is in the Down position and would otherwise attempt to continue to decrease the height. When the pallet 10 coupled to lift mechanism 302 is at a predetermined maximum allowable height, the directional control 352 may still operate in the 'down' position to effect movement of the pallet 10 downward. Similarly, when the pallet 10 of the lift mechanism 302 is at a predetermined minimum allowable height, the directional control 352 may still operate in the 'up' direction to effect movement of the pallet 10 coupled to the lift mechanism 302 in the up direction. The limit switches 358 and 360 may be, for example, the SHL series switches that are manufactured by the Omron Corporation.

It is to be understood that while electronic means may be used to sense the downward and upward position of the lift mechanism 302, that the up or down position of the lift mechanism 302 may be determined through the use of limit switches and that such limit switches may be operatively coupled to the lift mechanism 302 or the controller 80. Alternatively or additionally, minimum allowable lift height and maximum allowable lift height can be sensed through increased current draw of the lift motor 306, and the detection of minimum allowable lift height or maximum allowable lift height may cut power to the lift motor 306.

Referring back to FIG. 13B, prior to reaching respective maximum and minimum allowable heights, an Up relay 368 and a Down relay 370 may respectively cause the motor 306 to rotate or move in a direction that would result in an upward movement and a downward movement of the lift mechanism 302. Circuit protection for the control circuitry 72 may be provided, for example, through use of a fuse 366, which may have a value of 30 ampere. The relays 368 and 370 may be, for example, the T92 series manufactured by Potter & Brumfield.

With reference to the illustrative embodiment of FIG. 11, exemplary controller 80 may comprise a directional control 82. An exemplary directional control 82 may include a joystick, a switch, a key pad, a touch screen, a scrolling device, or an application running on a machine from the group consisting of computers, mobile devices, interactive displays, and combinations thereof. Where the controller 80 includes the control circuitry 352 for the lift mechanism 302, designated buttons for the lift mechanism may be provided. Alternatively, the same directional control 82 may be switched between a travel mode and a lift mode.

For example, in travel mode steering the DLC 300 as shown in FIG. 12A in the directions F, FL, FR, R, RL, and RR may be effected by actuating the directional control 82 in the corresponding directions. The FL direction may be achieved by the simultaneous actuation of the forward and left controls, for example by moving the joystick 82/92 to an intermediate position between the forward and left positions. The FR direction may be achieved by the simultaneous actuation of the forward and right controls, for example by moving the joystick 82/92 to an intermediate position between the forward and right positions. The RL direction may be achieved by the simultaneous actuation of the rearward and left controls, for example by moving the joystick 82/92 to an intermediate position between the rearward and left positions. The RR direction may be achieved by the simultaneous actuation of the rearward and right controls, for example by moving the joystick 82/92 to an intermediate position between the rearward and right positions.

Alternatively, in lift mode, all steering controls may be disabled and moving the directional control 82 in a forward/upward direction may cause the pallet 10 to be raised whereas moving the directional control 82 in a backward/downward direction may cause the pallet 10 to be lowered. In the lift mode, the right and left control positions of the joystick 82/92 may have no function. Suitable remote controllers having controls that can switch between alternate modes, such that the travel and lift modes as described herein may be set for said alternate modes of the selected controller, may include the VR2 control system from Curtiss Wright and the EnAble® 40 series from Curtis Instruments.

The speed of the movement in the steering directions (in travel mode) and the speed of movement in the up and down directions (in lift mode) may be controlled by the operator of the device. For example, the extent of the movement of the joystick 82/92 in a particular direction may correspond to a speed of the corresponding movement of the device. For example, as the operator of the device moves the joystick 82/92 away from a neutral center position in a particular direction, the speed of the corresponding movement may increase as the joystick 82/92 is moved farther from the neutral center position and the speed may decrease as the joystick 82/92 is moved back towards the initial neutral center position.

Various motors 306 may be suitable to be used with the lift mechanism 302. For example, the motor 306 may be a DC motor, which may be coupled to a transmission. The motor 306 may be coupled to the transmission via a socket, which may be for example a one-inch drive SAE standard socket. The same or similar mechanical or alternative coupling suitable for torque transmission between the motor 306 and the transmission may be used. The coupling may be, for example, a sleeve coupling, a flexible coupling, a tapered shaft lock coupling, a hirth coupling, a clamp coupling or some combination thereof.

An exemplary motor 306 may be any suitable motion delivery system that may transmit torque or motive force to the lift mechanism 302 to effect raising and lowering loads placed on the pallet 10. The motor 306 may include any suitable motor, which may be, for example, at least one of an electric motor, a combustion motor, a pneumatic motor, a magnet motor, and a hydraulic motor.

Also for example, the motor 306 may be a permanent magnet motor, which may be for example, of the type sold and manufactured by Leeson Electric Corporation of Grafton, Wis. Also for example, the motor 306 may be a 24 V motor, which may provide, for example, 1/10 horsepower and provide 15 lb-in of torque at 300 RPM. Preferably, the motor 306 may be of a relatively small size. For example, the motor 306 may be configured as a pancake shape. For example, 12 V pancake motors from PMI Motion Technologies of Commack, N.Y., may be utilized to reduce the space occupied by otherwise longer and cylindrical motors. Other motors 306 may include DC motors and parallel shaft gearmotors, which may be for example, from RAE Corporation of McHenry, Ill.

The lift mechanism 302 may include an integral motor and transmission. For example, a suitable integral motor and transmission may, for example, be that provided by Duff-Norton of Charlotte, N.C., which manufactures an integral lift mechanism including linear actuators.

A further embodiment of an exemplary motive construct or DLC 400 will now be described with respect to FIG. 14. The DLC 400 may include substantially the same features as discussed above with respect to the DLC 100 except in the ways noted hereinbelow.

The DLC 400 is configured to sense a characteristic of a load placed upon the pallet 14. In particular, one or more sensors 402 may be operatively coupled to the DLC 400. As shown in FIG. 14, the one or more sensors 402 may be placed underneath the pallet 10. It is to be understood that any suitable location of the sensor(s) 402 may be used provided the sensor 402 is within a sensing range to detect the characteristic of the load. However, other configurations and placements of the sensors may be apparent to one of ordinary skill in the art without deviating from the scope and spirit of the present disclosure. The sensor 402 may be configured to determine at least one characteristic of a load placed upon the pallet 10.

In an exemplary embodiment, the sensor 402 may be or may include a load cell configured to sense or determine gross, net, and tare weight information of the load. Such information may be recorded in at least one of a digital or printed format. For example, the weight information may be sent to a printer along with a date, a time, and/or a location of the weighing. The printer (not shown) may be located on the DLC 400, e.g. on the pallet 20, or may be external to the DLC 400. If the printer is external to the DLC 400, the information may be sent wirelessly to the printer or the DLC 400 may be driven to the printer and electrically connected to the printer via a cable, for example. The printed information, which may be in the form of a barcode, may be printed onto a label and may be adhesively applied to the load or its packaging. Additionally or alternatively, the information may be stored in a digital or printed log or journal.

Gross, net, and tare weight information along with date of weighing and time of weighing information can be printed in both a human readable and a bar code format. An example of printed stock suitable for receiving this information may include but is not limited to adhesive labels. One and two dimensional bar code formats may include but is not limited to UPC, EAN, code 39, code 128, QR, and data matrix. Wirelessly communicated signals include but are not limited to infrared, BLUETOOTH, radio wave, GPS, 802.11 g/b/n, IEEE 802.15.4 or a combination thereof.

Figure 14:
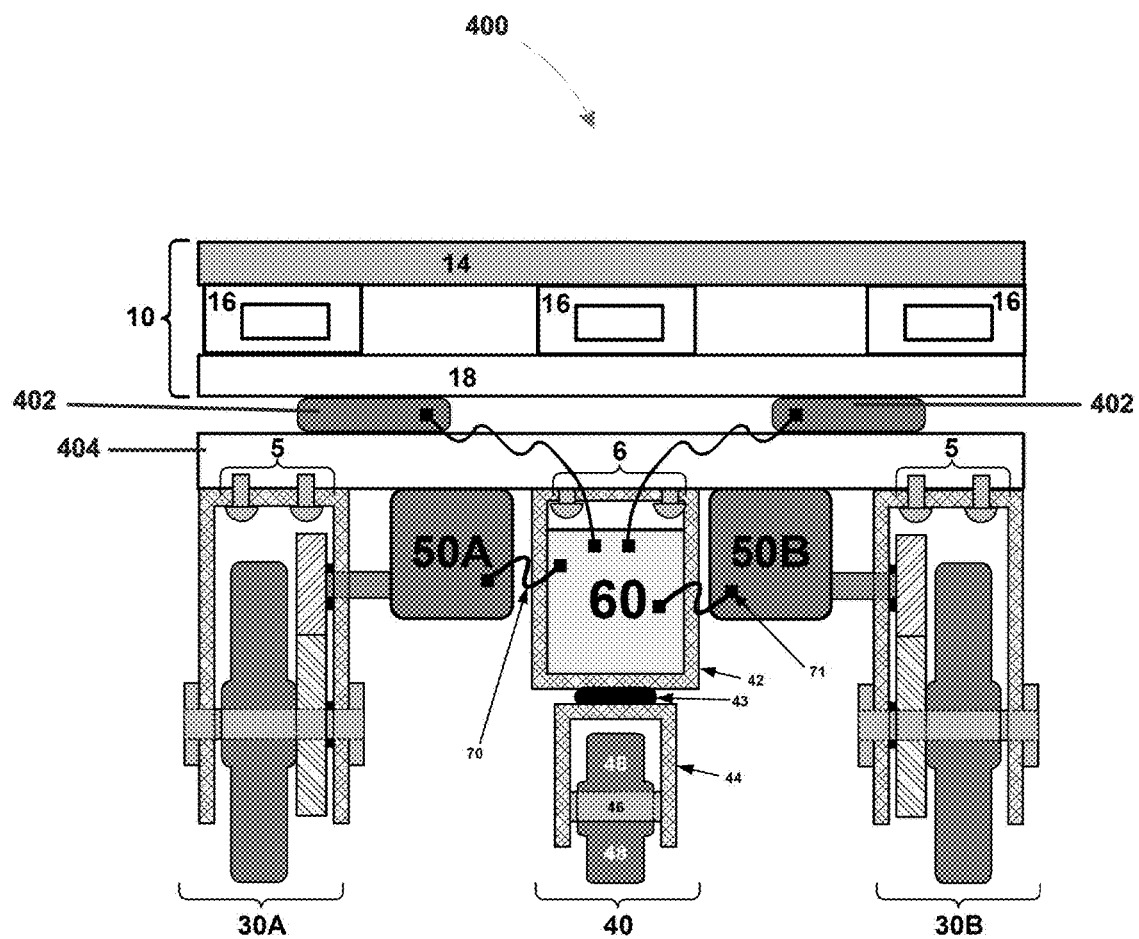
FIG. 14 is a side view of another exemplary embodiment of a driven loadable construct including a sensor in accordance with the present disclosure.

As shown in FIG. 14, a plurality of sensors 402 may be load cells, and the sensor(s) 402 may be securely positioned between a platform 404 and the pallet 10. Preferably, in order to maintain accuracy of the weighing information detected by the sensor(s) 402, the sensor(s) 402 may be positioned at a location corresponding to the center of the force of the load to be weighed such that the weight of the load is directed to the sensor(s) 402. If a single sensor 402 cannot be positioned at the center position of the force of the load to be weighed, more than one sensor 402 may be required for adequately weighing the load. As discussed above, the sensor 402 may be a load cell. The load cell may determine the weight of load by detecting a deformation corresponding to the weight as force is applied to the load cell. Additionally, a greater or lesser number of load cells placed at various locations relative to the pallet 10 may be required depending on the weight and weight distribution of the load or the size of the pallet 10. The load cells may be of various types including for example, hydraulic, pneumatic, capacitive, piezoelectric, or strain gauge cells. A load cell signal conditioner can be used to provide data outputs in a range of formats including RS232, RS485, and USB. Weighing information such as gross, net, and tare weight along with date and time of weighing and location of weighing (which may be provided, for example, by a GPS component or input by the device operator) information can be sent wirelessly to a printer in both a human readable and a bar code format.

A further embodiment of a motive construct or DLC 500 will now be described with reference to FIG. 15. The DLC 500 may include substantially the same features as discussed with respect to the DLC 100.

Generally, the DLC 500 may include a braking mechanism that is configured to brake the DLC 500 in response to a predetermined condition which may be, for example, a powering off of the DLC 500, a lack of a signal to move the DLC 500 between locations within an area, or a signal to brake the DLC 500 from the controller 80.

Figure 15:
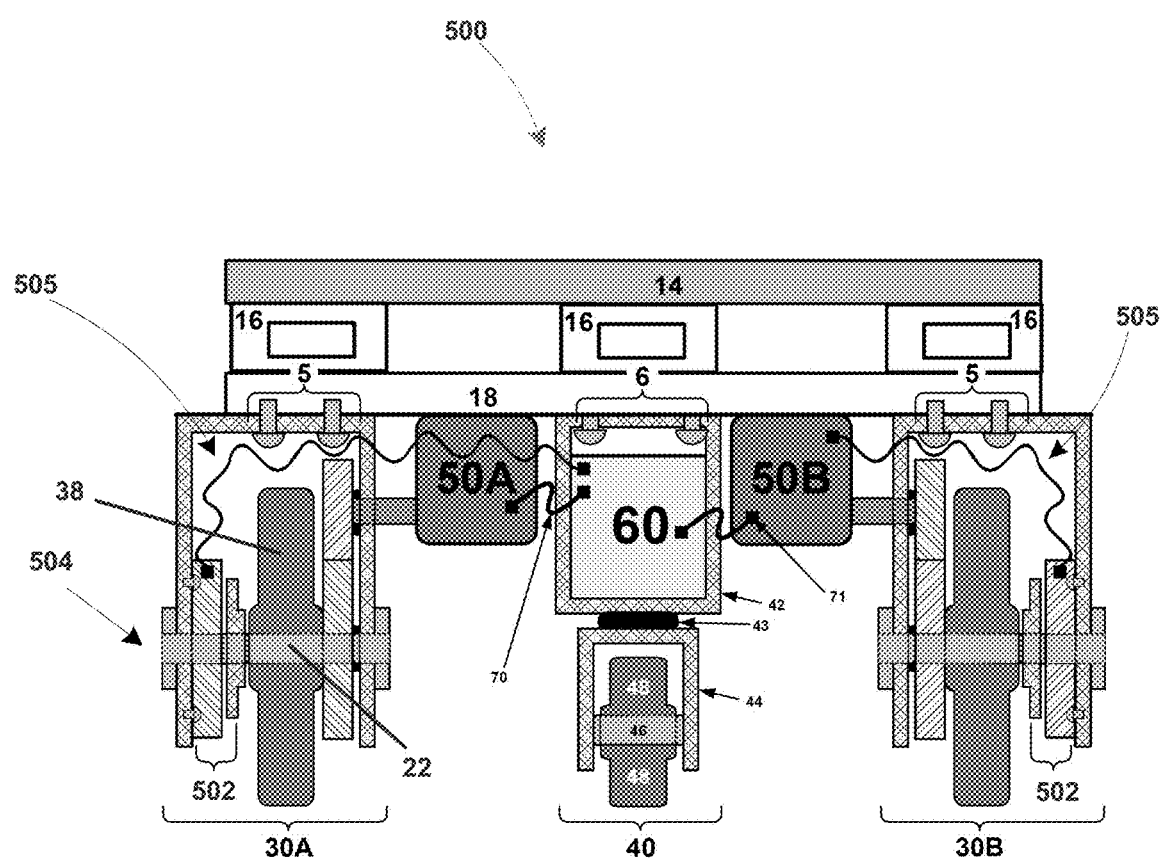
FIG. 15 is a side view of another exemplary embodiment of a driven loadable construct including a brake in accordance with the present disclosure.

As shown in FIG. 15, the DLC 500 may include a brake 502, which may be operatively coupled to the drive wheel assemblies 30A and 30B. While an electromagnetic brake is shown as being the brake 502 in FIG. 15, it is to be understood that other suitable brakes 502 may be utilized instead and that such brakes may include, for example, disc, drum, caliper, magnetic, hydraulic, pneumatic, electromagnetic, and the like, or any combination thereof. Spring-set power-off brakes may, for example, provide a safe, efficient means of stopping and/or holding a pallet in the absence of power.

In an exemplary embodiment, the brakes 502 may be electromagnetic brakes. As shown in FIG. 15, the brakes 502 may be powered via the power source 60, and each of the drive wheels 38 of the drive wheel assemblies 30A and 30B may be mounted upon a rotatable axle 22 and the electromagnetic brake 502 may also be coupled to the axle 22 to apply a braking force to the axle 22 to inhibit movement of the drive wheel 38. The electromagnetic brake 502 may include a stationary magnetic coil section (which is shown as being bolted within each of the wheel assemblies 30A, however it may be secured by any suitable means including, for example, any fastener element, an adhesive, or via welding) and a pressure or friction plate that may be secured relative to the axle 22 and is configured to interact with the stationary magnetic coil section when magnetically attracted thereto in order to cause a braking force. For example, the friction plate may be secured relative to the axle 22 and when the friction plate is magnetically attracted to and secured relative to the stationary magnetic coil section of the brake 502, the interaction of the friction plate and the stationary magnetic coil section may result in a braking force being imparted to the axle 22 and the drive wheel coupled to the axle 22 to slow down such that driving movement of the DLC 500 is slowed down and/or stopped.

The stationary magnetic coil section of the electromagnetic brake 502 may include a permanent magnet that attracts the pressure plate and applies a braking force when power is not applied to the coil such that the resting state of the electromagnetic brake 502 may be a braking condition. When power is applied to the coil, an alternate magnetic field may be set up such that it cancels out the magnetic flux of the permanent magnets to permit the wheel 38 to rotate and to disengage the brake 502. In other words, when power is not delivered to the electromagnetic brake 502, the brake 502 may be engaged and conversely when power is delivered to the electromagnetic brake 502, the brake 502 may be disengaged. Thus, advantageously, when the DLC 500 is not in use, the brake 502 may inhibit the DLC 500 from moving if the DLC 500 has been placed on a sloping surface, for example, when the motors that move the DLC 500 forward, backward, left, or right are not rotating. One brake 502, as shown in FIG. 15, may be associated with each of the drive wheels 38.

As shown in FIG. 15, control circuitry 505 may be operatively couple the electromagnetic brake 502 to any or all of the motors 50A, 50B, and the power source 60. For example, as shown in FIG. 15, one of the electromagnetic brakes 502 is operatively coupled to the power source 60 and the other electromagnetic brake 502 is operatively coupled to the motor 50B. Alternative suitable arrangements of electrical connections may be utilized without changing the scope and spirit of the present disclosure. The control circuitry 505 may be substantially similar as the control circuitry 65, 66, 70-72 discussed hereinabove, for example to electrically couple the brakes 502 to a suitable power source and/or to control their operation.

The electromagnetic brake 502 may be operatively coupled to at least one of the power source 60 or to the motors 50A and 50B, for example via an alternator (not shown) coupled to the motors to convert the mechanical energy of the motors to electrical energy. The electromagnetic brake 502 may be automatically energized when its associated motor is not rotating. Once the motor starts rotating the brake is de-energized.

A manual override 504 may allow the operator to disengage the brake 502 should the DLC 500 need to be moved to a remote location for servicing. For example, the manual override 504 may be operatively coupled to the brake 502. As shown in FIG. 15, the manual override 504 may be disposed at end of the axle 22 and may be oriented coaxially with a lengthwise axis of the axle 22. The manual override 504 may be physically coupled to the friction plate of the brake 502 such that when the manual override 504 is pushed along a lengthwise direction of the axle 22, the manual override 504 may urge the friction plate to disengage from the stationary magnetic coil section of the brake.

Alternatively or additionally, the manual override 504 may be operably coupled to the brake 502 such that when actuated (e.g. pressed), rather than physically pushing the friction plate apart from the stationary magnetic coil section, an electronic operation may occur that results in a change of the polarity of the coil in the stationary magnetic coil section thereby causing the friction plate and the stationary magnetic coil section to magnetically repel one another, such that the brake 502 transitions to a disengaged condition.

In another exemplary embodiment of a DLC including a braking system, a brake may be automatically energized when an associated motor is not running. Upon the commencement of the operation of the motor, the brakes may be disengaged. In particular embodiments of braking systems as would be understood by a person of ordinary skill in the art, although not illustrated in the accompanying figures, the push or pull of a solenoid, rotation of a servo motor, or rotation steps of a stepping motor can be used to energize and de-energize a brake depending on the particular braking system utilized. For example, in the case of a disc brake system, a disc brake may be operatively coupled to the drive wheels 38 and a braking cable to actuate the disc brake may be operatively coupled thereto. In particular, the energizing or de-energizing of the brake may be accomplished, for example, by pulling on or releasing an associated brake cable of the disc brake. Further, an electronic control module may be used to enhance solenoid performance by increasing force capability and reducing operating temperature. By way of the control module, the magnitude of electronic drive applied to the solenoid coil can be optimized during pull in or push out of the solenoid. Potential solenoids suitable for this embodiment may include the Q613 series from the Trombetta Corporation of Milwaukee, Wis. Potential solenoid control modules suitable for this embodiment may include the S500 series also sold by the Trombetta Corporation.

Having described at least one of the preferred embodiments of the present disclosure with reference to the accompanying drawings, it is to be understood that such embodiments are merely exemplary and that the disclosure is not limited to those precise embodiments, and that various changes, modifications, and adaptations may be effected therein by one skilled in the art without departing from the scope or spirit of the disclosure as defined in the appended claims. The scope of the disclosure, therefore, shall be defined solely by the following claims. Further, it will be apparent to those of skill in the art that numerous changes may be made in such details without departing from the spirit and the principles of the disclosure. For example, it is to be understood that although the DLC 100-500 described herein is described with reference to a pallet 10, any suitable surface or loadable construct on which a load may be placed may be substituted for the pallet 10 as the scope and spirit of present disclosure is not intended to be limited to pallets but rather would include any suitable loadable construct. It should be appreciated that the present disclosure is capable of being embodied in other forms without departing from its essential characteristics.

What is claimed is:

1. A device for supporting and moving a load within an area, the device comprising:
   a motive construct configured to support the load and move the load to a ground location within the area;
   a lift mechanism coupled to the motive construct, the lift mechanism being configured to effect movement of the motive construct to a height relative to the ground location; and
   a remote controller operatively coupled to the device via at least one of a cable connection and a wireless connection, the remote controller being configured to effect steering of the motive construct, the remote controller comprising:
      a plurality of control circuit components, each of which transmits a discrete signal as a result of physical interaction between a hand-operated directional control and the plurality of control circuit components; and connection circuitry for communicating the discrete signals from the plurality of control circuit components to a motor card coupled to at least one motor disposed on the motive construct.

2. The device for supporting and moving a load within an area of claim 1, wherein the remote controller is handheld.

3. The device for supporting and moving a load within an area of claim 1, wherein the lift mechanism is a scissor lift.

4. The device for supporting and moving a load within an area of claim 1, further comprising:
a motor; and
a transmission, the transmission operatively coupling the motor to the lift mechanism.

5. The device for supporting and moving a load within an area of claim 4, wherein the motor includes at least one of an electric motor, a combustion motor, a pneumatic motor, magnet motor, and a hydraulic motor.

6. The device for supporting and moving a load within an area of claim 1, further comprising at least one control circuit configured to control steering of the motive construct and to control operation of the lift mechanism, the remote controller being operatively connected to the at least one control circuit.

7. The device of claim 6, wherein the remote controller comprises at least one designated button for sending a signal related to at least one lift mechanism operation.

8. The device for supporting and moving a load within an area of claim 1, wherein the remote controller comprises:
a plurality of control circuit components each of which transmits a discrete signal as a result of physical interaction between a hand-operated directional control and the plurality of control circuit components.

9. The device for supporting and moving a load within an area of claim 8, wherein the directional control comprises a joystick, a switch, a key pad, a touch screen, a scrolling device, or an application running on a machine from the group consisting of computers, mobile devices, interactive displays, and combinations thereof.

10. The device for supporting and moving a load within an area of claim 1, further comprising:
at least one sensor operatively coupled to the motive construct, the sensor being configured to determine at least one characteristic of the load supported by the motive construct; and
at least one brake configured to selectively inhibit movement of the motive construct.

11. A device for supporting and moving a load, comprising:
a motive construct configured to support and move the load;
at least one sensor operatively coupled to the motive construct, the sensor being configured to determine at least one characteristic of the load supported by the motive construct, the at least one characteristic being recorded in at least one of a digital format, a printed format, a bar code format, and a human readable format; and
a remote controller operatively coupled to the device via at least one of a cable connection and a wireless connection, the remote controller being configured to steer the motive construct.

12. The device for supporting and moving a load of claim 11, wherein the at least one characteristic includes at least one of a gross weight, a net weight, and a tare weight.

13. A device for supporting and moving a load, comprising:
a motive construct configured to support and move the load;
at least one brake configured to selectively inhibit movement of the motive construct; and
a remote controller operatively coupled to the device via at least one of a cable connection and a wireless connection, the remote controller being configured to steer the motive construct, the remote controller comprising:
a plurality of control circuit components, each of which transmits a discrete signal as a result of physical interaction between a hand-operated directional control and the plurality of control circuit components; and
connection circuitry for communicating the discrete signals from the plurality of control circuit components to a motor card coupled to at least one motor disposed on the motive construct.

14. The device for supporting and moving a load of claim 13, wherein the at least one brake is an electromagnetic brake.

15. The device for supporting and moving a load of claim 13, wherein the at least one brake is a self-energizing brake.

16. The device for supporting and moving a load of claim 13, wherein the brake is configured to automatically inhibit movement of the motive construct in response to a predetermined condition.

17. The device for supporting and moving a load of claim 16, wherein the predetermined condition is when the device is in a powered off condition.

18. The device for supporting and moving a load of claim 16, further comprising:
a propulsion system configured to deliver a motive force to the device,
wherein the predetermined condition is when the propulsion system is not delivering the motive force to the device.

19. The device for supporting and moving a load of claim 13, further comprising:
an override release mechanism configured to manually release the at least one brake to permit movement of the motive construct.

* * * * *